US008224322B2

(12) United States Patent  (10) Patent No.: US 8,224,322 B2
Pan                        (45) Date of Patent:     Jul. 17, 2012

(54) ROAMING MOBILE SUBSCRIBER REGISTRATION IN A DISTRIBUTED MOBILE ARCHITECTURE

(75) Inventor: Shaowei Pan, Kildeer, IL (US)

(73) Assignee: Lemko Corporation, Schaumburg, IL (US)

( * ) Notice: Subject to any disclaimer, the term of this patent is extended or adjusted under 35 U.S.C. 154(b) by 833 days.

(21) Appl. No.: 11/451,238

(22) Filed: Jun. 12, 2006

(65) Prior Publication Data

US 2007/0287452 A1    Dec. 13, 2007

(51) Int. Cl.
    H04W 4/00    (2009.01)
(52) U.S. Cl. ............... 455/435.1; 455/433; 455/422.1
(58) Field of Classification Search .............. None
    See application file for complete search history.

(56) References Cited

U.S. PATENT DOCUMENTS

| | | |
|---|---|---|
| 4,284,848 A | 8/1981 | Frost |
| 5,590,175 A | 12/1996 | Gallant et al. |
| 5,623,495 A | 4/1997 | Eng et al. |
| 5,734,979 A | 3/1998 | Lu et al. |
| 5,933,784 A | 8/1999 | Gallagher et al. |
| 5,991,639 A | 11/1999 | Rautiola et al. |
| 6,122,499 A | 9/2000 | Magnusson |
| 6,131,038 A | 10/2000 | Sekine et al. |
| 6,141,564 A | 10/2000 | Bruner et al. |
| H1918 H | 11/2000 | Hoffpauir et al. |
| 6,160,804 A | 12/2000 | Ahmed et al. |
| 6,411,825 B1 | 6/2002 | Csapo et al. |
| 6,418,308 B1 | 7/2002 | Heinonen et al. |
| 6,421,325 B1 | 7/2002 | Kikinis |
| 6,515,985 B2 | 2/2003 | Shmulevich et al. |
| 6,539,237 B1 | 3/2003 | Sayers et al. |
| 6,542,497 B1 | 4/2003 | Curry et al. |
| 6,584,098 B1 | 6/2003 | Dutnall |
| 6,611,533 B1 | 8/2003 | Liao et al. |
| 6,614,784 B1 | 9/2003 | Glitho et al. |
| 6,647,426 B2 | 11/2003 | Mohammed |

(Continued)

FOREIGN PATENT DOCUMENTS

EP    0365885    5/1990

(Continued)

OTHER PUBLICATIONS

Hoffpauir et al., United States Statutory Invention Registration No. H1,918; Entitled "Integrated Authentication Center and Method for Authentication in a Wireless Telecommunications Network"; Filed Feb. 19, 1998; Published Nov. 7, 2000; 19 pages.

(Continued)

*Primary Examiner* — Willie J Daniel, Jr.
(74) *Attorney, Agent, or Firm* — Toler Law Group, PC

(57) ABSTRACT

A method of registering a mobile subscriber within a network including distributed mobile architecture nodes is disclosed. The method includes receiving a registration request from a mobile subscriber at a first distributed mobile architecture node within the network and storing an identifier of the first distributed mobile architecture node and the mobile subscriber at a memory location within a visitor location register (VLR) gateway. The VLR gateway is coupled to an element of a wide area wireless network. Also, a computer readable memory accessible to a distributed mobile architecture node of a distributed internet protocol network is disclosed. The computer readable memory includes a first field to identify a visiting mobile subscriber unit and a second field to identify an address of one of the distributed mobile architecture nodes of the distributed internet protocol network.

26 Claims, 28 Drawing Sheets

U.S. PATENT DOCUMENTS

| | | | |
|---|---|---|---|
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee et al. |
| 6,760,325 B1 | 7/2004 | Hameleers et al. |
| 6,763,226 B1 | 7/2004 | McZeal, Jr. |
| 6,763,233 B2 | 7/2004 | Bharatia |
| 6,791,988 B1 | 9/2004 | Hameless et al. |
| 6,795,444 B1 | 9/2004 | Vo et al. |
| 6,807,431 B2 | 10/2004 | Sayers et al. |
| 6,807,432 B2 | 10/2004 | Hwang |
| 6,816,706 B1 | 11/2004 | Hohnstein et al. |
| 6,819,652 B1 | 11/2004 | Akhtar et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B1 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2 | 2/2006 | Brown et al. |
| 7,050,414 B2 | 5/2006 | Lin |
| 7,054,307 B2 * | 5/2006 | Papadimitriou et al. ...... 370/353 |
| 7,054,322 B2 | 5/2006 | D'Annunzio et al. |
| 7,120,435 B2 | 10/2006 | Usher et al. |
| 7,120,436 B2 | 10/2006 | Kim |
| 7,133,670 B1 | 11/2006 | Moll et al. |
| 7,136,651 B2 | 11/2006 | Kalavade |
| 7,158,621 B2 | 1/2007 | Bayne |
| 7,171,216 B1 | 1/2007 | Choksi |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,346,334 B2 | 3/2008 | Gaeta et al. |
| 7,349,412 B1 | 3/2008 | Jones et al. |
| 7,359,700 B2 | 4/2008 | Swensen et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,536,170 B2 | 5/2009 | Goldman et al. |
| 7,539,158 B2 | 5/2009 | Pan |
| 7,548,763 B2 | 6/2009 | Pan |
| 7,552,670 B2 | 6/2009 | Goldman et al. |
| 7,653,414 B2 | 1/2010 | Pan |
| 7,738,488 B2 * | 6/2010 | Marsico et al. ............... 370/466 |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,036,158 B2 | 10/2011 | Pan et al. |
| 8,046,420 B2 | 10/2011 | Pan |
| 8,089,920 B2 | 1/2012 | Pan |
| 8,107,409 B2 | 1/2012 | Pan |
| 2001/0036173 A1 | 11/2001 | Shmulevich et al. |
| 2001/0046859 A1 | 11/2001 | Kil |
| 2001/0055298 A1 | 12/2001 | Baker et al. |
| 2002/0009060 A1 | 1/2002 | Gross |
| 2002/0016180 A1 | 2/2002 | Derosier et al. |
| 2002/0045444 A1 | 4/2002 | Usher et al. |
| 2002/0051518 A1 | 5/2002 | Bondy et al. |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0153343 A1 | 8/2003 | Crockett et al. |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1 | 8/2004 | Chava et al. |
| 2004/0203621 A1 | 10/2004 | Brown et al. |
| 2004/0203677 A1 | 10/2004 | Brown et al. |
| 2004/0204097 A1 | 10/2004 | Scheinert et al. |
| 2004/0253984 A1 | 12/2004 | Csapo et al. |
| 2004/0259556 A1 | 12/2004 | Czys |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0250491 A1 | 11/2005 | Roy et al. |
| 2006/0046714 A1 | 3/2006 | Kalavade |
| 2006/0046760 A1 | 3/2006 | Bertino et al. |
| 2006/0052113 A1 | 3/2006 | Ophir et al. |
| 2006/0063544 A1 | 3/2006 | Zhao et al. |
| 2006/0098661 A1 * | 5/2006 | Pan .............................. 370/401 |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1 | 1/2007 | Ophir |
| 2007/0060124 A1 | 3/2007 | Kalavade |
| 2007/0076697 A1 | 4/2007 | Huotari et al. |
| 2007/0087738 A1 | 4/2007 | Melkesetian |
| 2007/0147598 A1 | 6/2007 | Somes et al. |
| 2007/0213075 A1 | 9/2007 | Jiang |
| 2007/0230352 A1 | 10/2007 | Kokku et al. |
| 2007/0232304 A1 | 10/2007 | Goldman et al. |
| 2007/0234892 A1 | 10/2007 | Goldman et al. |
| 2007/0243891 A1 | 10/2007 | Civanlar et al. |
| 2007/0271606 A1 | 11/2007 | Amann et al. |
| 2007/0291910 A1 | 12/2007 | Bucchieri et al. |
| 2008/0101314 A1 | 5/2008 | Bachmutsky |
| 2008/0101410 A1 | 5/2008 | Barkley et al. |
| 2008/0146158 A1 | 6/2008 | Pan et al. |
| 2008/0168523 A1 | 7/2008 | Ansari et al. |
| 2009/0003269 A1 | 1/2009 | Kumazawa et al. |
| 2009/0022155 A1 | 1/2009 | Rosenberg et al. |
| 2009/0067441 A1 | 3/2009 | Ansari et al. |
| 2009/0186626 A1 | 7/2009 | Raghothaman |
| 2009/0215449 A1 | 8/2009 | Avner et al. |
| 2009/0227230 A1 | 9/2009 | Camilleri et al. |
| 2009/0325584 A1 | 12/2009 | Pan |
| 2009/0327819 A1 | 12/2009 | Pan |
| 2010/0048197 A1 | 2/2010 | Jiang |
| 2010/0048208 A9 | 2/2010 | Gunaratnam et al. |
| 2010/0057485 A1 | 3/2010 | Luft |
| 2010/0080214 A1 | 4/2010 | Li et al. |
| 2010/0094878 A1 | 4/2010 | Soroca et al. |
| 2010/0217837 A1 | 8/2010 | Ansari et al. |
| 2011/0059740 A1 | 3/2011 | Pan |
| 2011/0060853 A1 | 3/2011 | Pan |
| 2011/0223921 A1 | 9/2011 | Pan |
| 2012/0002607 A1 | 1/2012 | Pan |

FOREIGN PATENT DOCUMENTS

WO 2007102003 A1 9/2007

OTHER PUBLICATIONS

Pan, U.S. Appl. No. 13/309,003; "Providing Communications Using A Distributed Mobile Architecture"; Filed Dec. 20, 2011.

\* cited by examiner

FIG. 5

ROAMING MOBILE SUBSCRIBER REGISTRATION IN A DISTRIBUTED MOBILE ARCHITECTURE

FIELD OF THE DISCLOSURE

The present disclosure relates generally to distributed mobile communication systems.

BACKGROUND

Access to basic telephony service is particularly important for rural and isolated communities. Telephony access allows small-scale enterprises, cooperatives, and farmers to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to 1.2. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than 4 to 1.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment, e.g., the MSC, BSC, and HLR/VLR, are to be operated are extremely harsh and environmentally challenging. An alternative to such a cellular system can include a wired system, but the costs associated with deploying and maintaining land lines are too high for certain rural areas.

Accordingly, there exists a need for an improved communications system that is relatively inexpensive to deploy and relatively inexpensive to operate.

BRIEF DESCRIPTION OF THE DRAWINGS

The present invention is pointed out with particularity in the appended claims. However, other features are described in the following detailed description in conjunction with the accompanying drawings in which:

FIG. 5 is a diagram of an exemplary data structure for use by an authentication, authorization, and accounting module of a distributed mobile architecture;

DETAILED DESCRIPTION OF THE DRAWINGS

Figure 1:
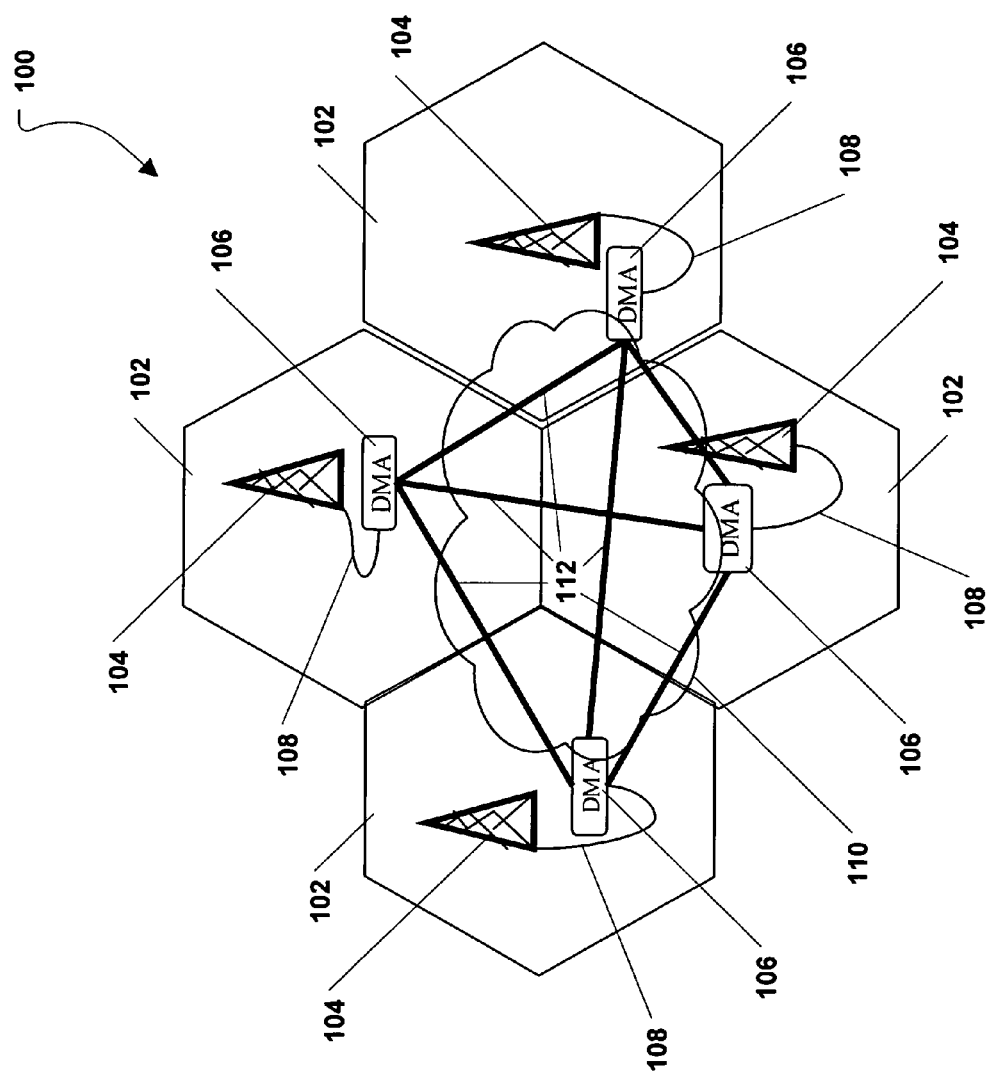
FIG. 1 is a diagram of a distributed and associative communication system.

In one embodiment, a method of registering a mobile subscriber within a network including distributed mobile architecture nodes is disclosed. The method includes receiving a registration request from a mobile subscriber at a first distributed mobile architecture node within the network and storing an identifier of the first distributed mobile architecture node and the mobile subscriber at a memory location within a visitor location register (VLR) gateway that is coupled to an element of a wide area wireless network.

In a particular embodiment, the element of the wide area wireless network is a mobile switching center that is coupled to a home location register (HLR), and the identifier can be forwarded from the VLR gateway to the HLR. In another particular embodiment, the wide area wireless network is a cellular network. Further, the method can include sending a message from the VLR gateway to the mobile switching center. Also, the identifier of the mobile subscriber can include an international mobile station identifier (IMSI) or an electronic serial number (ESN).

In a particular embodiment, the method further includes sending a registration acknowledge message to the first distributed mobile architecture node after the identifier is stored in a visitor location register (VLR) of the VLR gateway. In another particular embodiment, the mobile subscriber is located outside of a home location area associated with the mobile subscriber.

In yet another particular embodiment, a second distributed mobile architecture node is coupled to the VLR gateway. The second distributed mobile architecture node can receive the identifier from the first distributed mobile architecture node via a peer-to-peer data connection of the network. Also, the second distributed mobile architecture node can store the identifier at the memory location of the VLR gateway. The memory location can be within the second distributed mobile architecture node.

In a particular embodiment, the method further includes receiving a confirmation response at the VLR gateway in response to the message sent to the mobile switching center. The message can include the identifier and the confirmation response can confirm registration of the mobile subscriber within the wide area wireless network. Additionally, a registration acknowledge message may be sent to the first distributed mobile architecture node after receiving the confirmation response.

In another embodiment, a computer readable memory that is accessible to a distributed mobile architecture node of a distributed internet protocol network is disclosed. The computer readable memory can include a first field to identify a visiting mobile subscriber unit and a second field to identify an address of one of the distributed mobile architecture nodes of the distributed internet protocol network. The first field can store an international mobile station identifier (IMSI) of the mobile subscriber unit. The first field can also store an electronic serial number (ESN) of the mobile subscriber unit. In a particular embodiment, one of the distributed mobile architecture nodes communicates with the visiting mobile subscriber unit.

In yet another embodiment, a visitor location register is disclosed. In this embodiment, the visitor location register can include a first item to identify a first visiting mobile subscriber unit, a second item to identify an address of a first of a plurality of distributed mobile architecture nodes of a distributed internet protocol network, a third item to identify a second visiting mobile subscriber unit, and a fourth item to identify an address of a second of the distributed mobile architecture nodes of the distributed internet protocol network. The first of the distributed mobile architecture nodes communicates with the first visiting mobile subscriber unit and the second of the distributed mobile architecture nodes may communicate with the second visiting mobile subscriber unit.

In another embodiment, a method of routing a call from a wide area wireless network to a mobile subscriber via a distributed mobile architecture network is disclosed. The method includes sending a routing request to a visitor location register gateway associated with a first node of the distributed mobile architecture network from a mobile switching center of the wide area wireless network, accessing a visitor location register within the visitor location register gateway to identify a distributed mobile architecture node associated with the mobile subscriber, and sending a routing message from the first node of the distributed mobile architecture network to the distributed mobile architecture node associated with the mobile subscriber. In one embodiment, the first node of the distributed mobile architecture network is the distributed mobile architecture node associated with the mobile subscriber.

In a particular embodiment, the method also can include establishing a communication path from the distributed mobile architecture node to the mobile subscriber. Further, the method may include communicating between the mobile switching center and the mobile subscriber via the distributed mobile architecture network. The visitor location register can be located at an authentication, authorization, and accounting module of the first node of the distributed mobile architecture network.

In yet another embodiment, a method of placing a call is disclosed. The method includes sending a call routing request from a mobile switching center to a node of a distributed mobile architecture network that includes a visitor location register that identifies a set of visiting mobile subscriber units, receiving an acknowledgement to the call routing request from the node of the distributed mobile architecture network, and placing the call from the mobile switching center to a mobile subscriber unit. The mobile subscriber unit can be a roaming mobile subscriber unit that is identified as having a corresponding register entry at the visitor location register.

In a particular embodiment, the node of the distributed mobile architecture network includes a housing, a mobile switching center module disposed within the housing, and a base station controller module disposed within the housing. The node of the distributed mobile architecture network can be coupled to another node of the distributed mobile architecture network via an internet protocol data connection.

Referring to FIG. 1, a non-limiting, exemplary embodiment of a distributed and associative telecommunications system is illustrated and is generally designated. As depicted in FIG. 1, the system includes four cellular coverage sites 102. Each coverage site 102 includes an antenna 104. In one embodiment, the antenna 104 is connected to a transceiver belonging to a base transceiver station (BTS) and the BTS is a 3-sector BTS. FIG. 1 also indicates that a distributed mobile architecture (DMA) 106 can be connected to each antenna 104. In one embodiment, each DMA 106 is physically and directly connected to its respective antenna 104, e.g., by a wire or cable 108. Further, in an illustrative embodiment, each DMA 106 can include the components described herein in conjunction with FIG. 3.

As illustrated in FIG. 1, each DMA 106 is interconnected with the other DMAs 106 via an Internet protocol network 110. As such, there exists a peer-to-peer connection 112 between each DMA 106 in the system. The DMAs 106 can handle telephony traffic that is communicated at each antenna 104. For example, the DMAs 106 can switch and route calls received via each antenna 104. Additionally, the DMAs 106 can hand-off calls to each other as mobile communication devices move around and between the cellular coverage sites 102. The DMAs 106 can communicate with each other via the IP network 110 and can further transmit calls to each other via the IP network 110. It should be understood that more than four cellular coverage sites 102 can be included in the system and that the inclusion of only four cellular coverage sites 102 in FIG. 1 is merely for clarity and explanation purposes.

Within the distributed and associative communications system, the controlling logic can be distributed and de-centralized. Moreover, the wireless coverage provided by the disclosed systems self-healing and redundant. In other words, due to the interconnectivity via the IP network 110, if one or more of the DMAs 106 loses power, fails, or is otherwise inoperable, telephony traffic handled by the inoperable DMA 106 can be re-routed to one of the remaining operable DMAs 106. Additionally, user data stored in a database, e.g., a home locator resource (HLR) or a visitor locator resource (VLR), can be distributed equally and fully among all of the DMAs 106. It can also be appreciated that new cellular coverage sites can be easily added to the system 100 as the demand for users increases. Specifically, a DMA can be deployed, connected to an antenna, connected to the IP network, and activated to provide cellular coverage in a new area.

Figure 2:
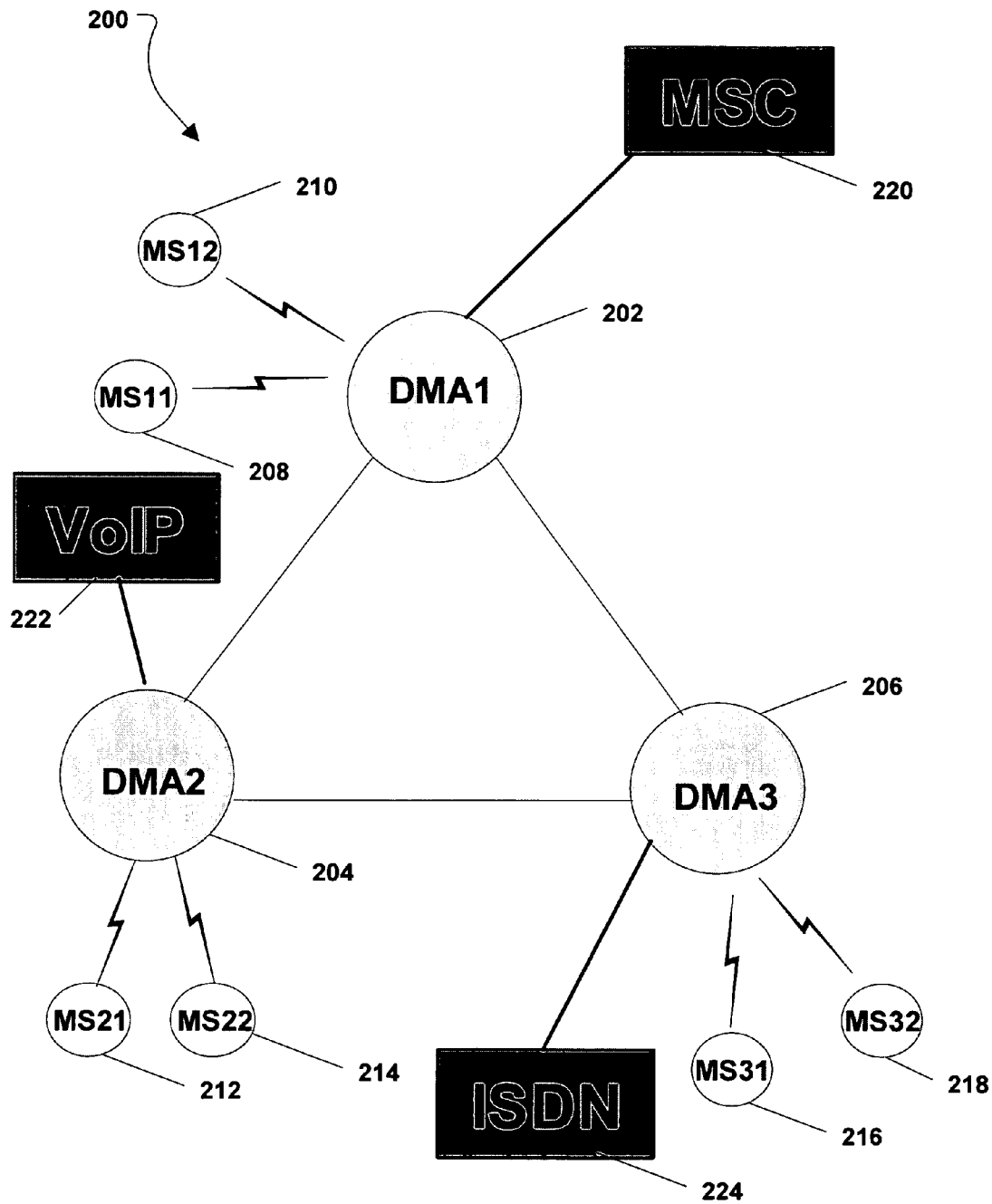
FIG. 2 is a diagram of a network including a plurality of distributed mobile architectures.

FIG. 2 shows an exemplary, non-limiting embodiment of a network system, generally designated 200, that includes a plurality of DMAs. As illustrated in FIG. 2, the system 200 can include an Internet protocol (IP) peer-to-peer network that includes a first distributed mobile architecture 202 that is coupled to a second distributed mobile architecture 204 and to a third distributed mobile architecture 206. Further, the second distributed mobile architecture 204 is coupled to the third distributed mobile architecture 206.

Figure 3:
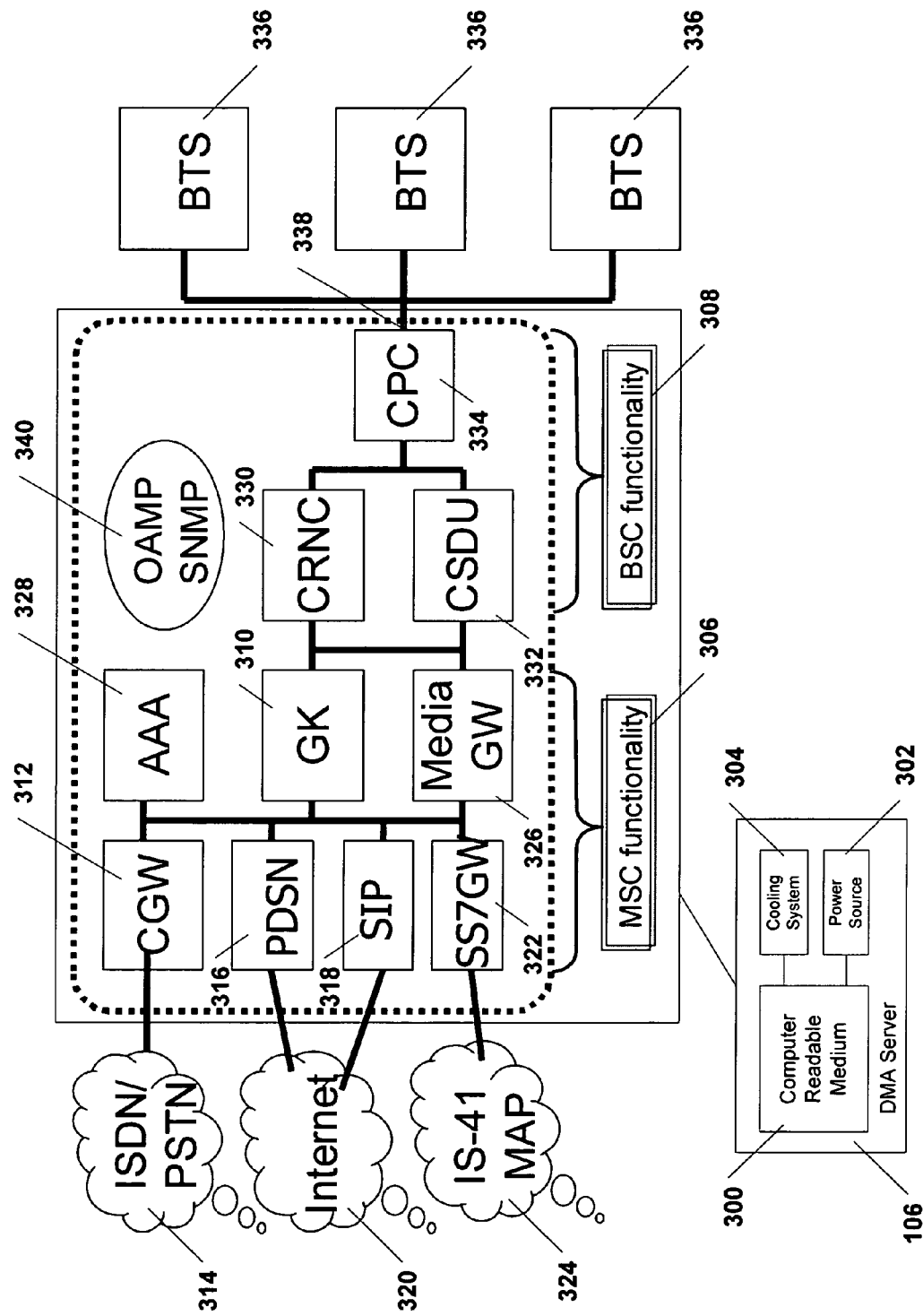
FIG. 3 is a block diagram of a distributed management architecture server.

As shown in FIG. 2, a first mobile subscriber 208 and a second mobile subscriber 210 are wirelessly coupled to the first distributed mobile architecture 202. A first mobile subscriber 212 and a second mobile subscriber 214 are wirelessly coupled to the second distributed mobile architecture 204. Additionally, a first mobile subscriber 216 and a second mobile subscriber 218 are wirelessly coupled to the third distributed mobile architecture 206. FIG. 3 further indicates that a mobile switching center (MSC) interface 220 can be coupled to the first distributed mobile architecture 202 to provide access to a mobile telephone network, such as a cellular telephone network. Further, a voice over Internet protocol (VoIP) interface 222 is coupled to the second distributed mobile architecture 204 to provide access to a VoIP network. FIG. 3 also shows that an integrated services digital network (ISDN) interface 224 can be coupled to the third distributed mobile architecture 206 to provide connectivity to an ISDN.

In a particular embodiment, as described in detail herein, a mobile subscriber can communicate with another mobile subscriber via the first distributed mobile architecture 202, the second distributed mobile architecture 204, or the third distributed mobile architecture 206. Further, in a particular embodiment, a mobile subscriber can communicate with another mobile subscriber via the first distributed mobile architecture 202 and the second distributed mobile architecture 204, the first distributed mobile architecture 202 and the third distributed mobile architecture 206, and the second distributed mobile architecture 204 and the third distributed mobile architecture 206. Additionally, in a particular embodiment, a mobile subscriber can communicate with another mobile subscriber via the first distributed mobile architecture 202, the second distributed mobile architecture 204, or the third distributed mobile architecture 206.

Further, in a particular embodiment, the first mobile subscriber 210 of the first DMA 202 can be connected locally to the second mobile subscriber 210 of the first DMA 202 after locating the second mobile subscriber 210 within the a home location register (HLR) within the first DMA 202. Additionally, the first or second mobile subscriber 210, 212 of the first DMA 202 can be connected to the first or second mobile subscriber 212, 214 of the second DMA 204 after locating the first or second mobile subscriber 212, 214 of the second DMA 204 within a second community location register (CLR) associated with the second DMA 202 that is stored within the first DMA 202. Moreover, the first or second mobile subscriber 210, 212 of the first DMA 202 can be connected to the first or second mobile subscriber 216, 218 of the third DMA 206 after locating the first or second mobile subscriber 216, 218 of the third DMA 206 within a third community location register (CLR) associated with the third DMA 206 that is stored within the first DMA 202.

As a mobile subscriber roams into a coverage area that is not provided by the DMA to which the mobile subscriber is registered, the mobile subscriber can be temporarily registered with a new DMA while the mobile subscriber is roaming. CLR information concerning the roaming mobile subscriber can be obtained from the new DMA in order to complete a call to the roaming mobile subscriber.

In another particular embodiment, calls can be made from a mobile subscriber to an external destination, i.e., external to the DMA network, via the MSC interface 220, the VoIP interface 222, or the ISDN interface 224. A user can create a preferred hierarchy of interfaces to make calls external to the DMA network. As such, a user can indicate that all calls made from a mobile subscriber to an external device are to be established via the VoIP interface 222. If the VoIP interface 222 is unavailable, a second preferred interface can be used to establish the external call.

Figure 25:
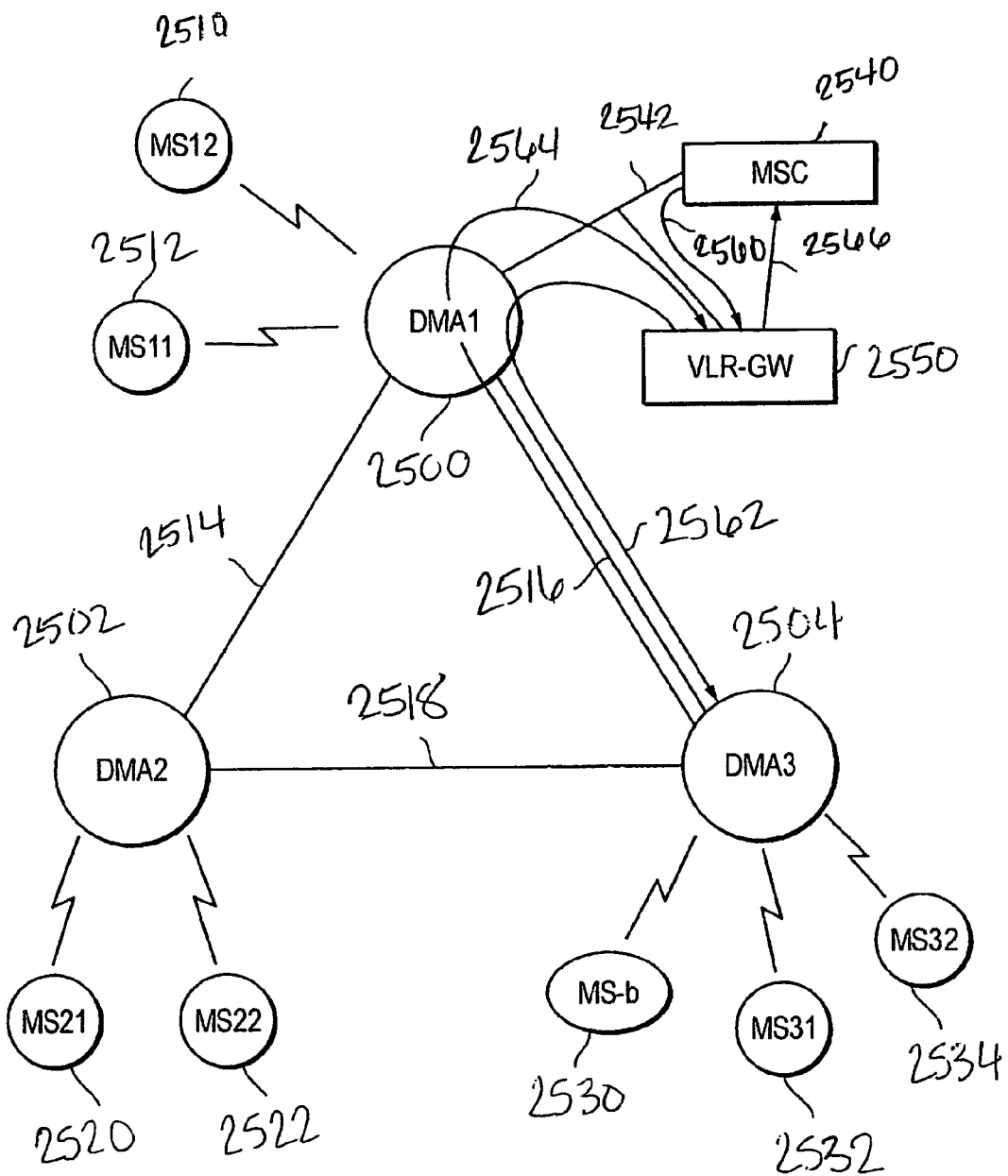
FIG. 25 is a diagram of a network including a plurality of distributed mobile architectures utilizing a visitor location register gateway.

FIG. 3 shows an exemplary, non-limiting, embodiment of a DMA, e.g., one of the DMAs 106 described in conjunction with FIG. 1, one of the DMAs 202, 204, 206 shown in FIG. 2, or one of the DMAs 2500, 2502, 2504 as shown in FIG. 25. In a particular embodiment, the DMA 106 includes a processor, or computer, having a housing and a computer readable medium 300 that is disposed therein. A power supply 302 can also be disposed within the housing of the DMA 106 in order to provide power to the DMA 106. The power supply 302 can be a rechargeable battery disposed within the DMA 106 or it can be external to the DMA 106, i.e., a standard power outlet. Moreover, a cooling system 304, e.g., a fan with a thermostat, can be within the DMA 106 in order to keep the DMA 106 from overheating. In an alternative embodiment, the DMA 106 can be a single board processor that does not require a fan.

As depicted in FIG. 3, the DMA 106 can include a mobile switching center (MSC) module 306 and a base station controller (BSC) module 308 embedded within the computer readable medium 300. In an exemplary, non-limiting embodiment, the MSC module 306 can include a gatekeeper (GK) 310 that is connected to several gateways. For example, a circuit gateway (CGW) 312 can be connected to the GK 310 and can provide connectivity to an integrated services digital network/public switched telephone network (ISDN/PSTN) interface 314. The CGW 312 can provide a circuit switched to packet data conversion. In an exemplary, non-limiting embodiment, the PSTN portion of the ISDN/PSTN interface 314 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 314.

As further illustrated in FIG. 3, a packet data service node (PDSN) gateway 316 for CDMA, or a Gateway GPRS Support Node (GGSN) for Global System for Mobile Communication (GSM), and a Session Initiation Protocol (SIP) gateway 318 can also be connected to the GK 310. The PDSN gateway 316 and the SIP gateway 318 can provide connectivity to an Internet protocol (IP) interface 320. Further, the PDSN gateway 316 or a GGSN can establish a reverse tunnel with the PDSN or GGSN gateway 316 using generic routing encapsulation (GRE). Moreover, the PDSN gateway 316, or GGSN, can implement the Pseudo Random Function (PRF)/Foreign Agent (FA) functionality of the DMA 106 which supports mobile IP functions.

FIG. 3 further shows an SS7 gateway 322 that provides connectivity to an ANSI-41 and GSM Mobile Application Part (MAP) interface 324. In a particular embodiment, the ANSI-41 interface can be an SS7 TCAP/SCCP interface on the same SS7 link set used for ISUP signaling. The same SS7 point code can be used to identify the DMA 106 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently.

As depicted in FIG. 3, a media gateway 326 can also be coupled to the GK 310. In an exemplary, non-limiting embodiment, the media gateway 326 can include cellular transcoders, one or more intranet gateways, conferencing bridges, and group calling functionality. Further, an authentication, authorization, and accounting (AAA) module 328 can be coupled to the GK 310. In an exemplary, non-limiting embodiment, there are three levels of authentication management. The highest level is for administration, the mid-level is for operations, and the lowest level is for normal users. The functions of the AAA module 328 can be included in the user level.

In an exemplary, non-limiting embodiment, the GK 310 can act as an AAA server and a feather server to support advanced supplementary service, short message service, etc. Moreover, the GK 310 can act as a call manager and can support ISUP and PSTN function calls. Additionally, the GK 310 can act as a signal gateway, e.g., IP to SS7 inter-working, ISUP, GSM MAP or ANSI-41 to PSTN and ANSI-42/GSM. The GK 310 can also function as a data call server.

As illustrated in FIG. 3, the BSC module 308 includes a cellular radio network controller (CRNC) 330 and a cellular selection/distribution unit (CSDU) 332 that are connected to a call protocol controller (CPC) 334. In turn, the CPC 334 can be connected to a plurality of base transceiver stations (BTSs) 336. Specifically, the DMA 106 includes a BTS interface 338 at the CPC 334 that can be physically and directly connected to the BTSs 336. The CRNC 330 can provide cellular radio resource management and cellular call control. The CSDU 332 can provide Fundamental Channel (FCH) soft handoff and distribution, Link Access Control (LAC) processing for inband signaling, multiplexer (MUX) functions, and centralized power control. Further, the CPC 334 can convert a T1 or E1 message or ATM interface to a data packet message. In a particular embodiment, each BTS 336 supports signals and traffic up to the front point of the CPC 334, e.g., up to the BTS interface 338. Further, in a particular embodiment, the CRNC 330, the CPC 334, the CSDU 332 and the OAMP 340 can perform one or more of the functions of legacy Base Station Controllers (BSC).

In an exemplary, non-limiting embodiment, the BTS interface 338 can be an IS-95A OR IS-2000 interface over E1 or ATM, or the BTS interface 338 can be a GSM BTS interface using MAP or customized application for mobile network enhanced logic (CAMEL). In an illustrative embodiment, the CPC 334 can be connected to one or more BTSs 336. FIG. 3 further shows that the BSC module 308 includes an operations, administration, maintenance, and provisioning (OAMP) module 340. In an exemplary, non-limiting embodiment, the OAMP module 340 can use simple network management protocol (SNMP) for operations interfaces. Further, the OAMP module 340 can include a JAVA user interface. The OAMP module 340 can also include a software agent that is assigned to each component within the DMA 106. The agents independently monitor their respective components. Moreover, each agent can provision its respective component.

In a particular embodiment, a DMA can be implemented as a system or a device. For example, a DMA system or a DMA device can include a DMA server or a DMA on board processor.

Figure 4:
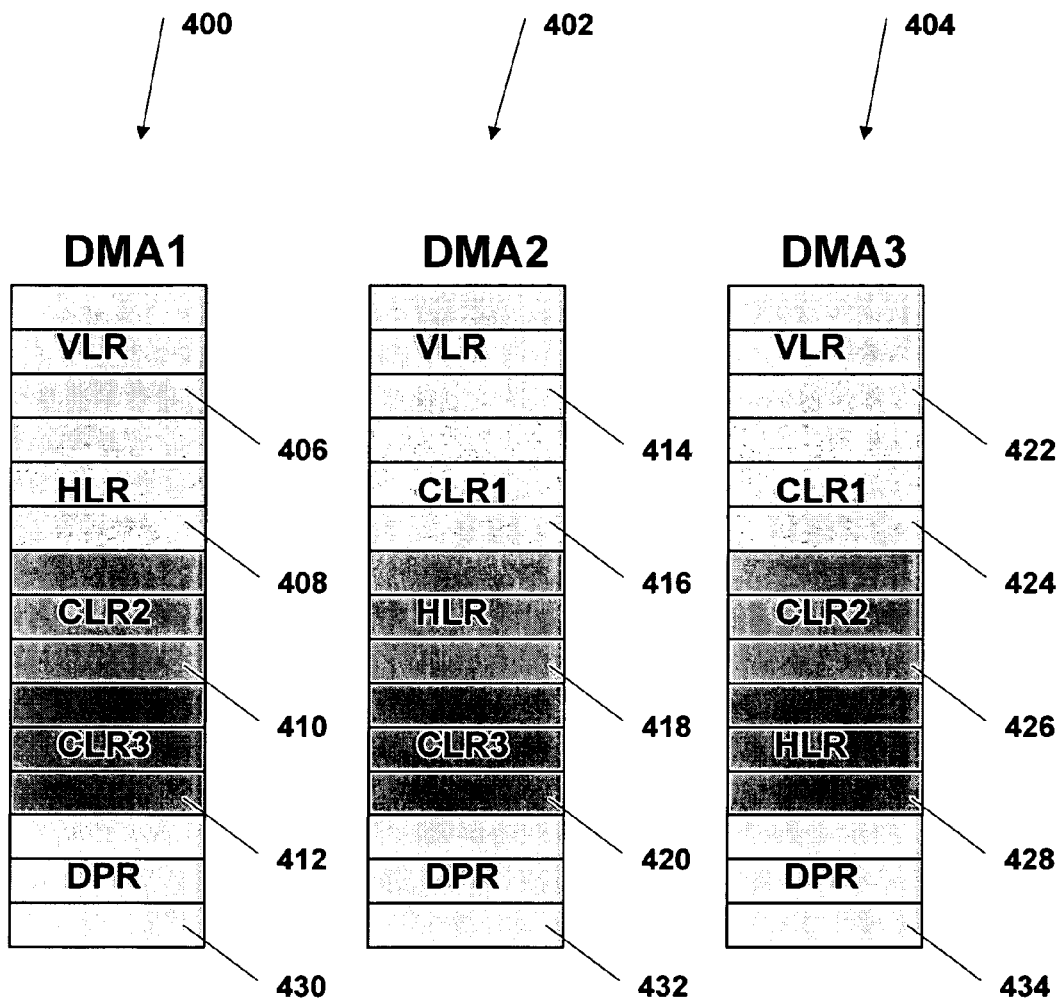
FIG. 4 is a diagram of a plurality of distributed mobile architectures.

FIG. 4 depicts a plurality of DMAs. Particularly, FIG. 4 depicts a first DMA 400, a second DMA 402, and a third DMA 404. FIG. 4 indicates that, in general, each DMA 400 includes a visitor location register (VLR), a home location register (HLR), and at least one community location register (CLR). In a particular embodiment, the VLR, HLR, and the CLR within each DMA 400, 402, 404 are part of an AAA module within each DMA 400, 402, 404. For example, the HLR, VLR, and CLR may be within the AAA module 328 of the exemplary DMA of FIG. 3.

In a particular embodiment, as indicated in FIG. 4, the first DMA 400 includes a VLR 406, an HLR 408, a second CLR 410, and a third CLR 412. Further, the second DMA 402 includes a VLR 414, a first CLR 416, an HLR 418, and a third CLR 420. Additionally, the third DMA 404 includes a VLR 422, a first CLR 424, a second CLR 426, and an HLR 428.

In an exemplary, non-limiting embodiment, the first CLR 416 within the second DMA 402 and the first CLR 424 within the third DMA 404 correspond to the HLR 408 of the first DMA 400. More particularly, the first CLR 416 within the second DMA 402 and the first CLR 424 within the third DMA 404 include information that is stored within the HLR 408 of the first DMA server 400.

Additionally, in an exemplary, non-limiting embodiment, the second CLR 410 within the first DMA 400 and the second CLR 426 within the third DMA 404 correspond to the HLR 418 of the second DMA 402. More particularly, the second CLR 410 within the first DMA 400 and the second CLR 426 within the third DMA 404 include the information that is stored within the HLR 418 of the second DMA server 402.

Also, in an exemplary, non-limiting embodiment, the third CLR 412 within the first DMA 400 and the third CLR 420 within the second DMA 402 correspond to the HLR 428 of the third DMA 404. More particularly, the third CLR 412 within the first DMA 400 and the third CLR 420 within the second DMA 402 include the information that is stored within the HLR 428 of the third DMA server 404.

FIG. 4 further indicates that the first DMA 400 can include a destination preference register (DPR) 430. Also, the second DMA 402 can include a DPR 432. Moreover, the third DMA 404 can also include a DPR 434. In a particular embodiment, each DPR 430, 432, 434 includes a preference for a call path to be used to place calls outside of a DMA network provided by the DMAs 400, 402, 404. In a particular embodiment, the preference is established for each mobile subscriber registered with the DMA network. In another embodiment, the preference is established for each DMA within the DMA network.

Figure 5:
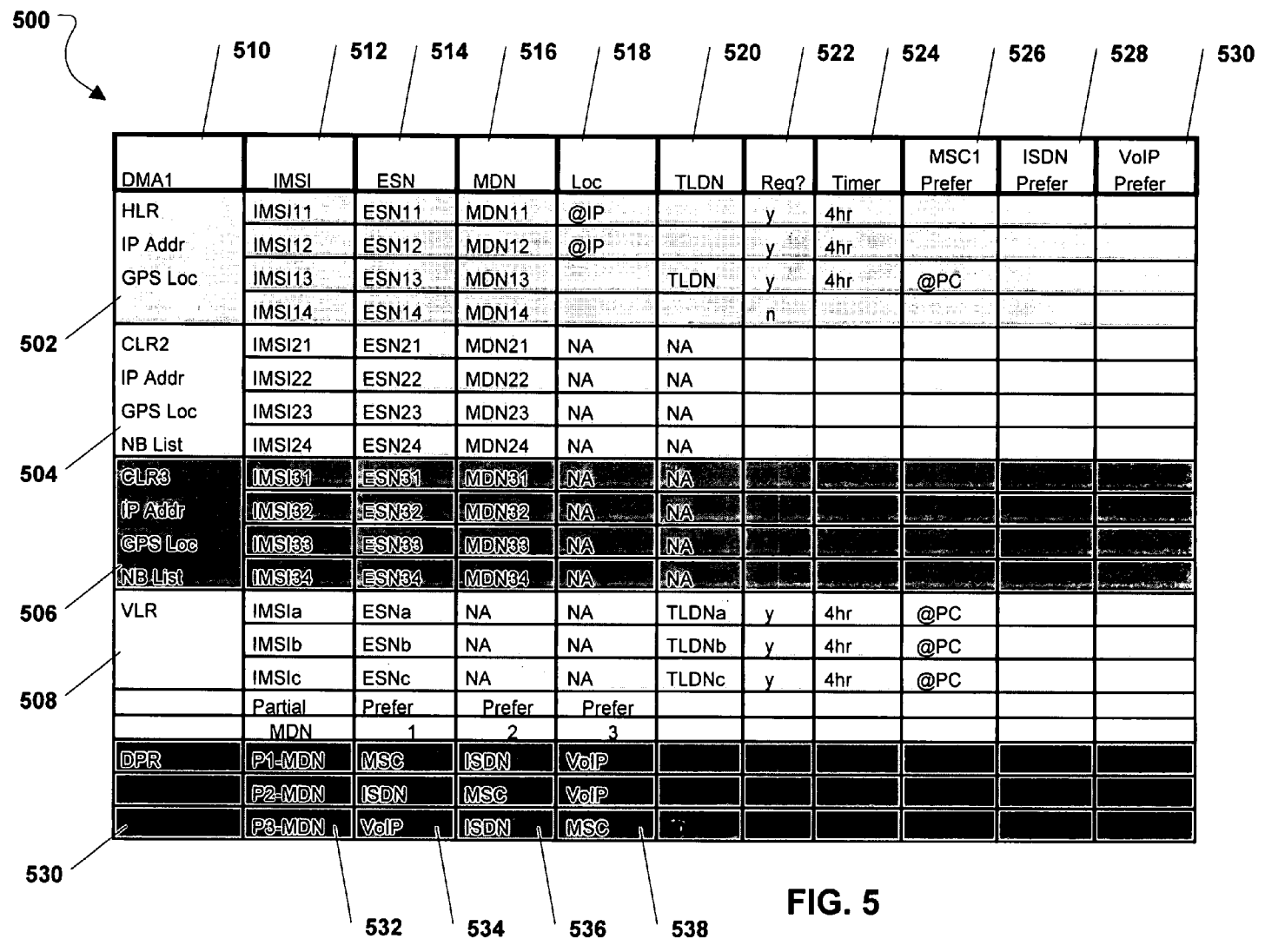

Referring to FIG. 5, an exemplary, non-limiting embodiment of an authentication, authorization, and accounting (AAA) module is shown and is generally designated 500. The AAA module depicted in FIG. 5 can be embedded within any of the DMAs that are described herein. As indicated in FIG. 5, the AAA module 500 includes data associated with an HLR 502, a second CLR 504, a third CLR 506, and a VLR 508. As shown, the HLR 502 data includes a plurality of IP addresses that can be used to establish one or more telephone calls within a first DMA in which the AAA module 500 is embedded. The HLR 502 data further includes a GPS location of the first DMA in which the AAA 500 is embedded.

As illustrated in FIG. 5, the second CLR 504 and the third CLR 506 include one or more IP addresses that can be used to establish one or more telephone calls via a second and third DMA that are coupled to the first DMA in which the AAA module 500 is embedded. The second CLR 504 and the third CLR 506 also include a GPS location for the second and third DMA that are coupled to the first DMA in which the AAA module 500 is embedded. Further, the second CLR 502 and the third CLR 504 include a neighborhood (NB) list to identify neighboring DMS that are located proximately to the DMA in which the AAA module 500 is embedded.

FIG. 5 further indicates the data associated with the HLR 502, the second CLR 504, the third CLR 506, and the VLR 508 include at least one international mobile subscriber identification (IMSI) 512 and at least one electronic series number (ESN) 514. Moreover, the HLR 502, the second CLR 504, and the third CLR 506 records also include at least one mobile directory number (MDN) 516. In a particular embodiment, the HLR 502 includes a location 518 for at least one mobile subscriber that is registered with the HLR 502.

As shown in FIG. 5, the HLR 502 and the VLR 508 further include at least one temporary location directory number (TLDN) 520, a registration indicator 522, a timer 524, a mobile switching center (MSC) preference indicator 526, an integrated services digital network (ISDN) preference indicator 528, and a voice over Internet protocol (VoIP) preference indicator 530. And a timer interval given to the visited mobile to be registered.

As shown in FIG. 5, the AAA module 500 can also include a DPR 530. As shown the DPR 530 includes at least one MDN prefix 532. Further, the DPR 530 includes a first preferred destination indicator 534, a second preferred destination indicator 536, and a third preferred destination indicator 538. In a particular embodiment, the preferred destination indicators 534, 536, 638 indicate a hierarchy of call paths that may be used to place calls outside a DMA network provided by one or more DMAs. For example, the first preferred destination indicator 534 can be a VoIP call path, the second preferred destination indicator 536 can be an ISDN call path, and the third destination indicator can be an MSC call path.

As such, in an illustrative embodiment, when a mobile subscriber attempts to call a particular MDN that is not within the HLR 502, the second CLR 504, or the third CLR 506, the AAA module 500 can match the prefix of the MDN to the at least one MDN prefix in order to determine a preferred call path destination for establishing a call outside of the DMA network provided by the DMA in which the AAA module 500 is embedded. Accordingly, if a user wishes to save money, the user can choose to make calls outside of the DMA network via a VoIP interface. In another example, if a user wishes to have a higher call quality, the user can choose to make calls outside of the DMA network via an ISDN interface.

Figure 6:
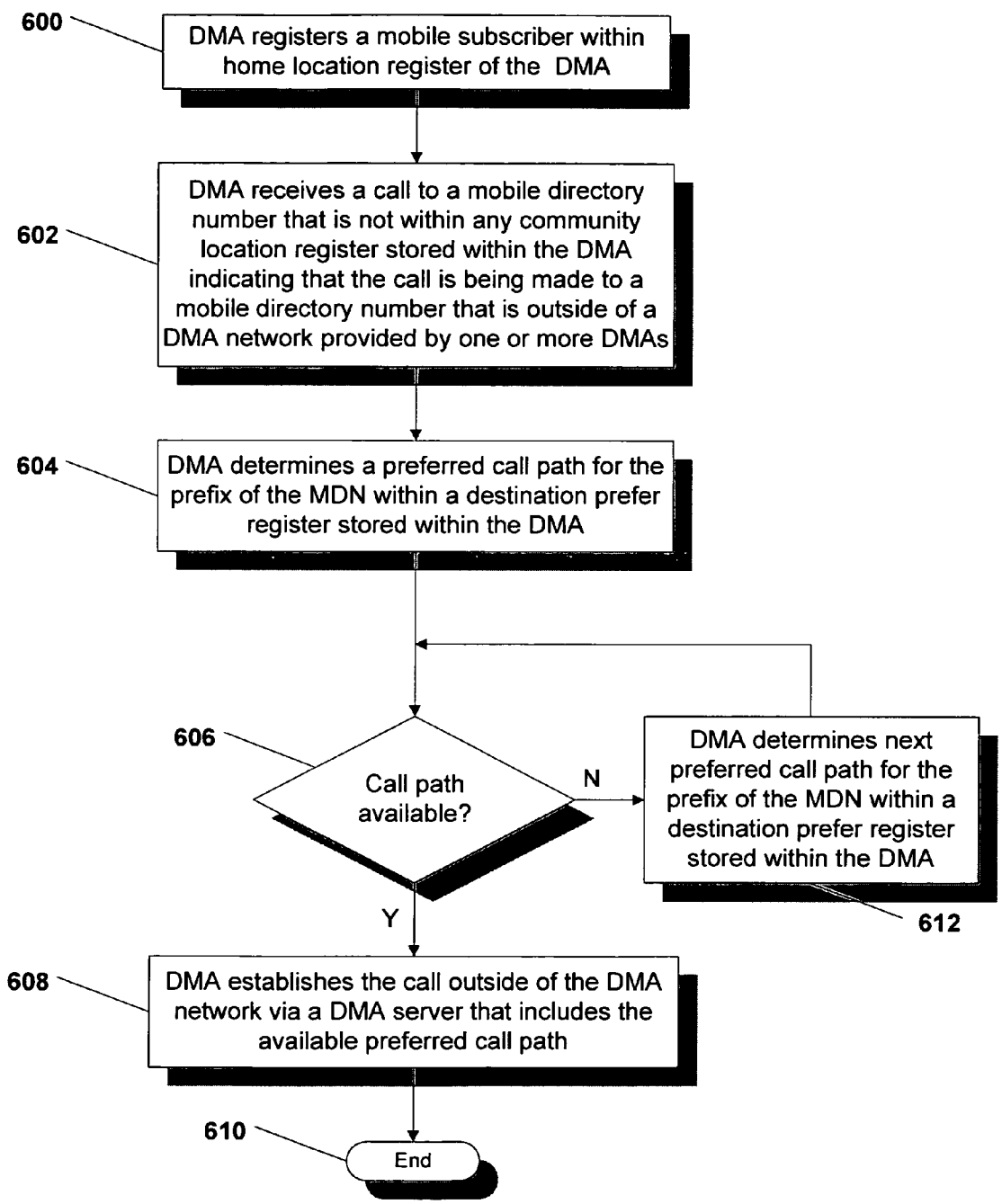
FIG. 6 is a flow chart to illustrate a method of determining a preferred call path for calls to be routed outside of a DMA network.

Referring to FIG. 6, a method of determining a preferred call path for calls to be routed outside of a DMA network is shown and commences at block 600. At block 600, a DMA registers a mobile subscriber within a home location register (HLR) of the DMA. At block 602, the DMA receives a call directed to a destination mobile directory number (MDN) that is not within any community location register (CLR) stored within the DMA. In a particular embodiment, this is an indication that the call is being made to a mobile directory number that is outside of a DMA network provided by one or more DMAs. Moving to block 604, the DMA determines a preferred call path based on the prefix of the MDN. In a particular embodiment, the DMA can match the prefix of the MDN with an MDN prefix within a destination preference register (DPR) stored within the DMA in order to determine a hierarchy of preferred call paths for routing the call to the MDN. In a particular embodiment, the MDN is a ten digit telephone number, e.g., 222-333-4444, and the prefix of the MDN can be the first three digits of the number, e.g., 222. Further, in a particular embodiment, the preferred call path can be placed over a VoIP interface, an ISDN interface, or an MSC interface.

Proceeding to decision step 606, the DMA determines whether an interface associated with a selected first preferred the call path is available. If so, the method continues to block 608 and the DMA establishes the call to the MDN outside of the DMA network via a DMA server that routes the call over the preferred call path. The method then ends at state 610. For example, with reference to FIG. 2, if the first subscriber 208 of the first DMA 202 includes a first preferred call path that is set to ISDN and the ISDN interface at the third DMA 206 is available, a call from the first subscriber 208 of the first DMA 202 to an external device can be routed to the third DMA 206. In turn, the third DMA 206 can route the external device via the ISDN interface 224.

Returning to decision step 606, if the first preferred call path is not available, the DMA determines the next preferred call path for the matching MDN prefix within the DPR. The method then returns to decision step 606 and continues as described herein. Again, with reference to FIG. 2, if the ISDN interface 224 is unavailable, a call to an external device can be routed to the first DMA 202, which can route the call to the external device via the MSC interface 220. Additionally, if the ISDN interface 224 and the MSC interface 220 are unavailable, a call to an external device can be routed to the second DMA 204, which can route the call to the external device via the VoIP interface. In a particular embodiment, if none of the preferred call paths are available, the DMA can indicate that the call cannot be connected.

Figure 7:
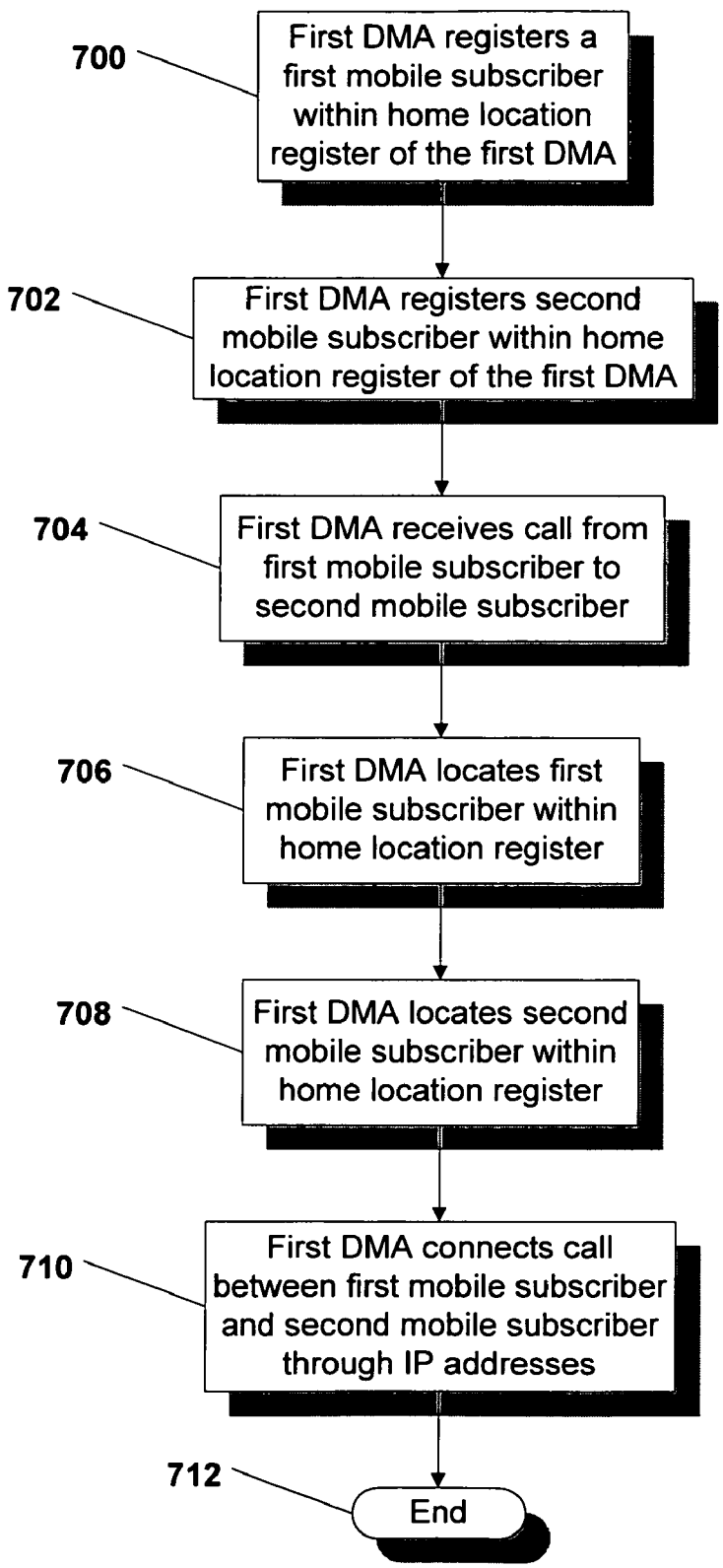
FIG. 7 is a flow chart to illustrate a method of providing a call between a first mobile subscriber and a second mobile subscriber via a single distributed mobile architecture.

Referring to FIG. 7, a method of establishing communication via a distributed mobile architecture (DMA) is shown and commences at block 700. At block 700, the DMA registers a first mobile subscriber within the home location register (HLR) of the DMA. Next, at block 702, the DMA registers a second mobile subscriber within the home location register (HLR) of the DMA. Moving to block 704, the DMA receives a call from the first mobile subscriber to the second mobile subscriber. At block 706, the DMA locates the first mobile subscriber within the home location register of the DMA. Next, at block 708, the DMA locates the second mobile subscriber within the home location register of the DMA. Proceeding to block 710, the DMA connects the call between the first mobile subscriber and the second mobile subscriber via one or more local IP addresses within the DMA. The method then ends at state 712.

Figure 8:
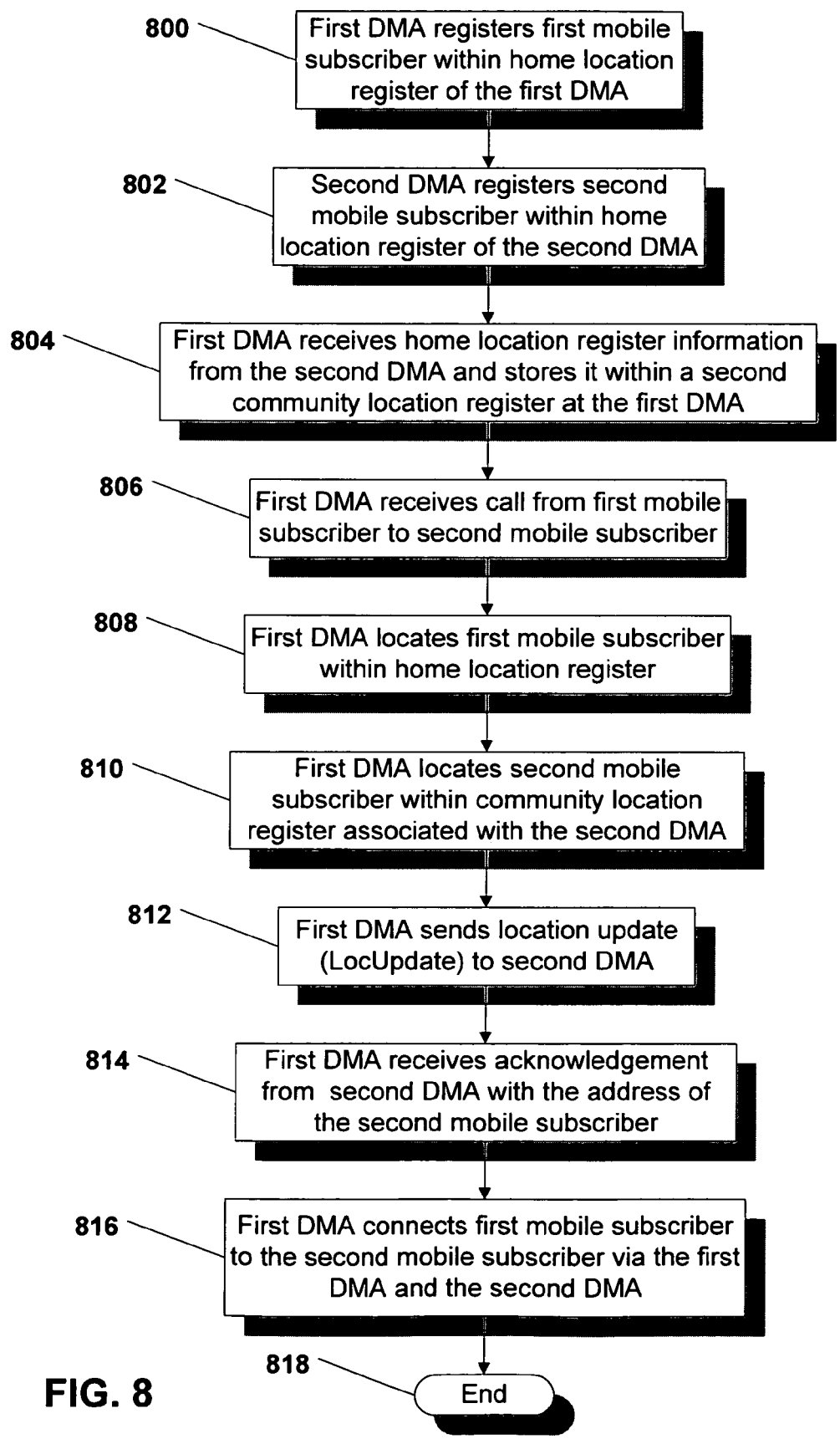
FIG. 8 is a flow chart to illustrate a method of providing a call between a first mobile subscriber and a second mobile subscriber via a first distributed mobile architecture and a second distributed mobile architecture.

FIG. 8 depicts a method of establishing communication via a first distributed mobile architecture (DMA) and a second DMA. Beginning at block 800, the first DMA registers a first mobile subscriber within a home location register (HLR) of the first DMA. At block 802, the second DMA registers a second mobile subscriber within the home location register (HLR) of the second DMA. Thereafter, at block 804, the first DMA pre-fetches the home location register (HLR) information from the second DMA and stores it within a second community location register (CLR) at the first DMA. In a particular embodiment, the first DMA and the second DMA can be linked to each other via an IP network.

Moving to block 806, the first DMA receives a call from the first mobile subscriber to be routed to the second mobile subscriber. At block 808, the first DMA locates the first mobile subscriber within the home location register (HLR) of the first DMA. Proceeding to block 810, the first DMA locates the second mobile subscriber within the second community location register (CLR) associated with the second DMA. At block 812, the first DMA sends a location update request (LocUpdate) to the second DMA. Next, at block 814, the first DMA receives an acknowledgement from the second DMA. In an illustrative embodiment, the acknowledgement includes the current address of the second mobile subscriber within the second DMA. Continuing to block 816, the first DMA connects the first mobile subscriber to the second mobile subscriber via the first DMA and the second DMA by assigning an IP address at both the first DMA and the second DMA. The method then ends at state 818.

Figure 9:
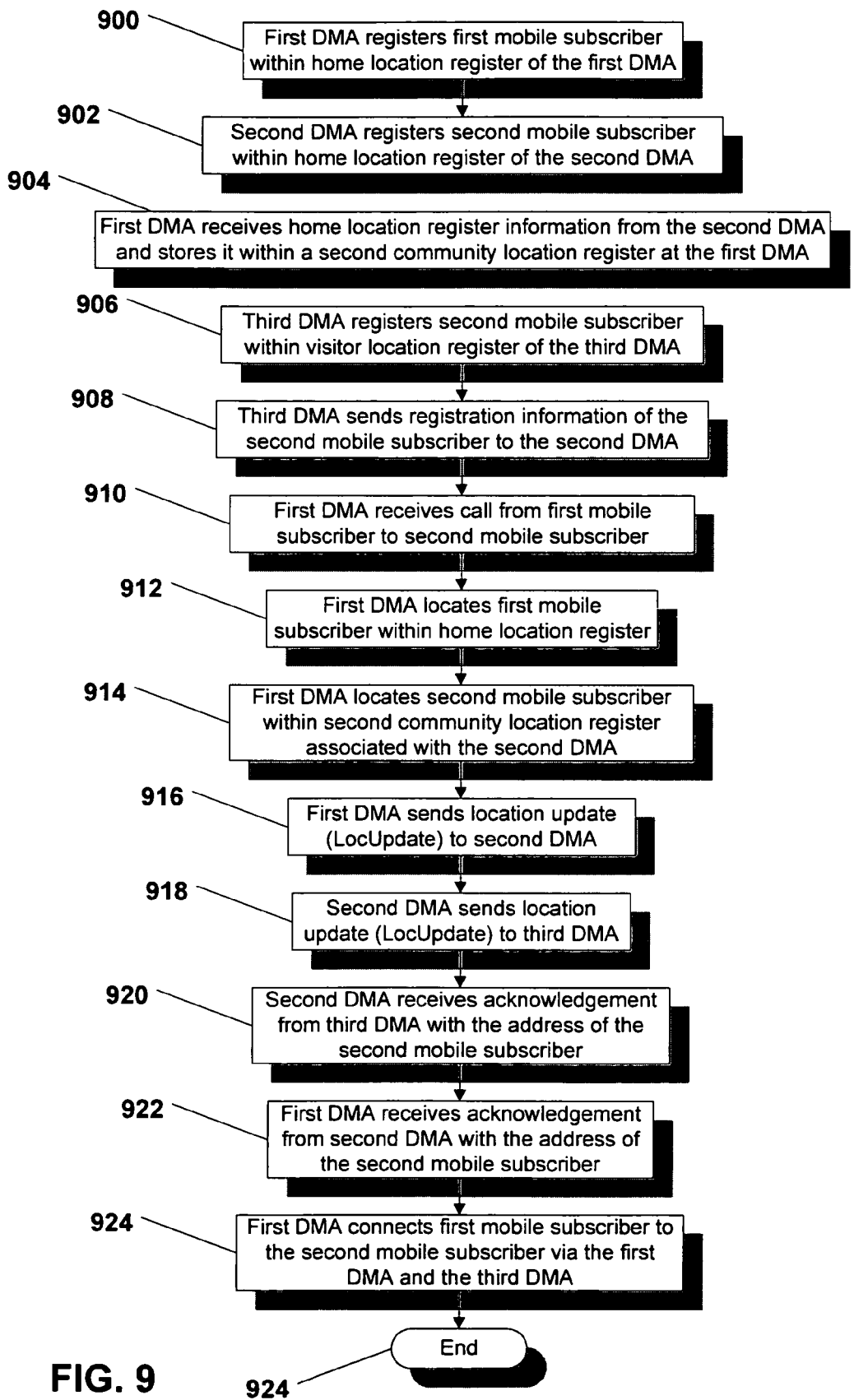
FIG. 9 is a flow chart to illustrate a method of providing a call between a first mobile subscriber and a roaming second mobile subscriber via a first distributed mobile architecture and a third distributed mobile architecture.

Referring to FIG. 9, a method of establishing communication between a first mobile subscriber and a second mobile subscriber that is roaming is shown and commences at block 900. At block 900, a first distributed mobile architecture (DMA) registers a first mobile subscriber within a home location register (HLR) of the first DMA. At block 902, a second DMA registers a second mobile subscriber within a home location register (HLR) of the second DMA. Moving to block 904, the first DMA receives the home location register (HLR) information from the second DMA and stores it within a second community location register (CLR) at the first DMA.

Proceeding to block 906, a third DMA registers the second mobile subscriber within a visitor location register (VLR) of the third DMA. In a particular embodiment, this indicates that the second mobile subscriber has roamed into a coverage area controlled by the third DMA. At block 908, the third DMA sends the registration information of the second mobile subscriber to the second DMA.

Moving to block 910, the first DMA receives a call from the first mobile subscriber to be routed to the second mobile subscriber. Thereafter, at block 912, the first DMA locates the first mobile subscriber within the home location register (HLR) of the first DMA. At block 914, the first DMA locates the second mobile subscriber within the second community location register (CLR) that is associated with the second DMA.

Proceeding to block 916, the first DMA sends a location update request (LocUpdate) to the second DMA. At block 918, the second DMA sends the location update (LocUpdate) to the third DMA. Then, at block 920, the second DMA receives an acknowledgement from the third DMA. In a particular embodiment, the acknowledgement includes a current address of the second mobile subscriber within the third DMA. For example, the third DMA can retrieve the current address of the second mobile subscriber from the VLR within the third DMA. Continuing to block 922, the first DMA receives the acknowledgement from the second DMA with the address of the second mobile subscriber. Next, at block 924, the first DMA connects the first mobile subscriber to the second mobile subscriber via the first DMA and the third DMA. For example, an IP address at the third DMA is assigned to the call and is used to route the call over an IP network between the first DMA and the third DMA. The method then ends at state 926.

Figure 10:
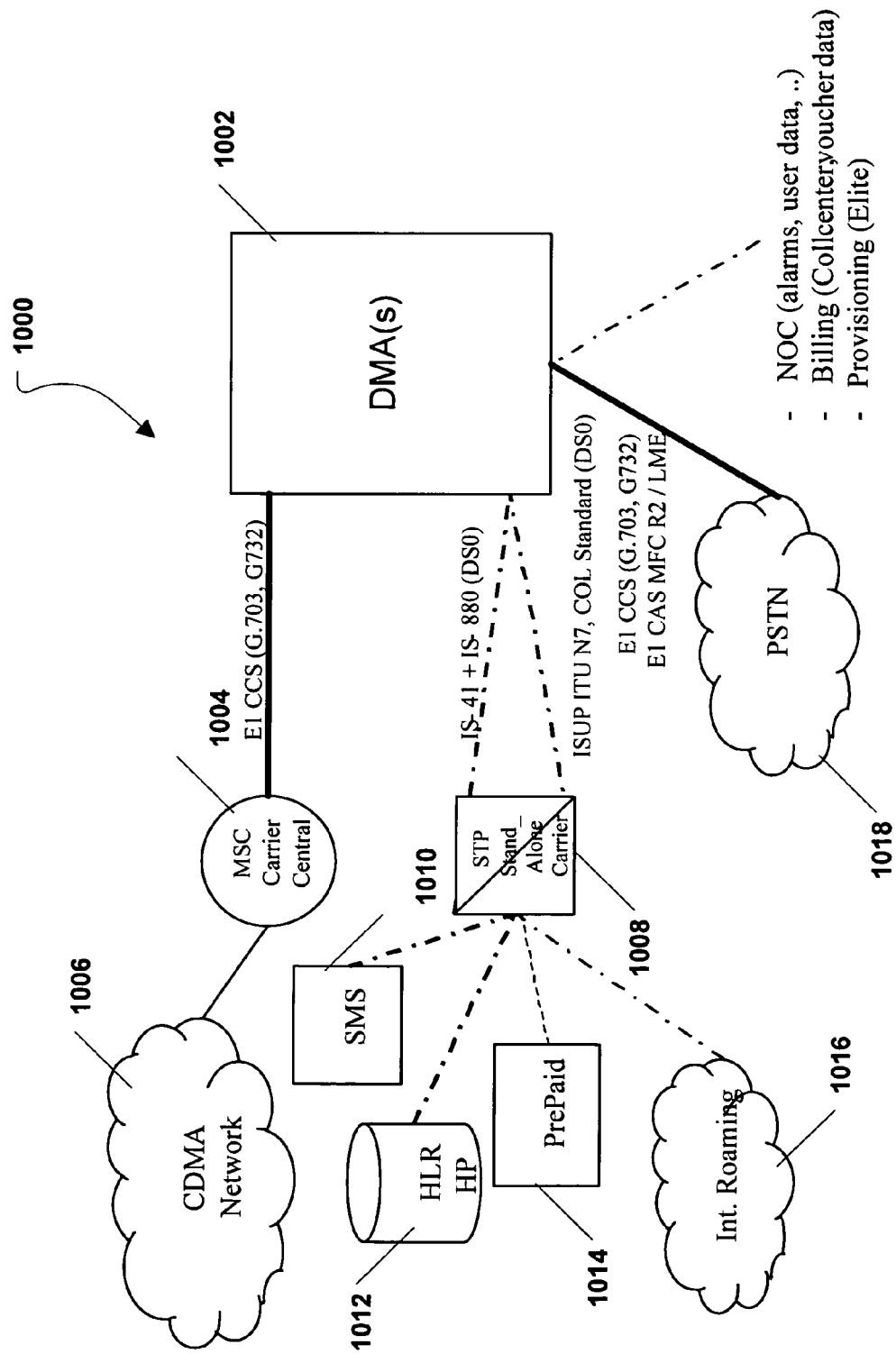
FIG. 10 is a diagram of an exemplary communication system in which a distributed management architecture server can be incorporated.

Referring to FIG. 10, an exemplary, non-limiting embodiment of a telecommunications system is shown and is generally designated 1000. As shown, the system includes one or more DMAs 1002 that are connected to a wireless carrier's central MSC 1004. The DMA(s) 1002 can be connected to the MSC 1004 via an E1 CCS (G.703, G732) connection, or any other applicable connection. The MSC, 1004 in turn, is connected to a code division multiple access (CDMA) network 1006. FIG. 10 further shows that the DMA(s) 1002 can be connected to a switching transfer point (STP) 1008 of a stand-alone carrier. As shown, the DMA 1002 can be connected to the STP 1008 via an IS-41+IS-880 (DS0) connection, or an ISUP ITU N7 connection.

As further depicted in FIG. 10, the STP 1008 can be connected to a short messaging service (SMS) server 1010 in order to provide text-messaging capabilities for the mobile communication devices using the system 1000 shown in FIG. 10. Additionally, the STP 1008 can be connected to a home location register (HLR) 1012, a pre-paid wireless server 1014 and an international roaming network 1016 in order to provide pre-paid services and roaming between multiple countries. FIG. 10 shows that the DMA(s) 1002 can be connected to the PSTN 1018 via an E1 CCS (G.703, G732) connection, or any other appropriate connection.

Figure 11:
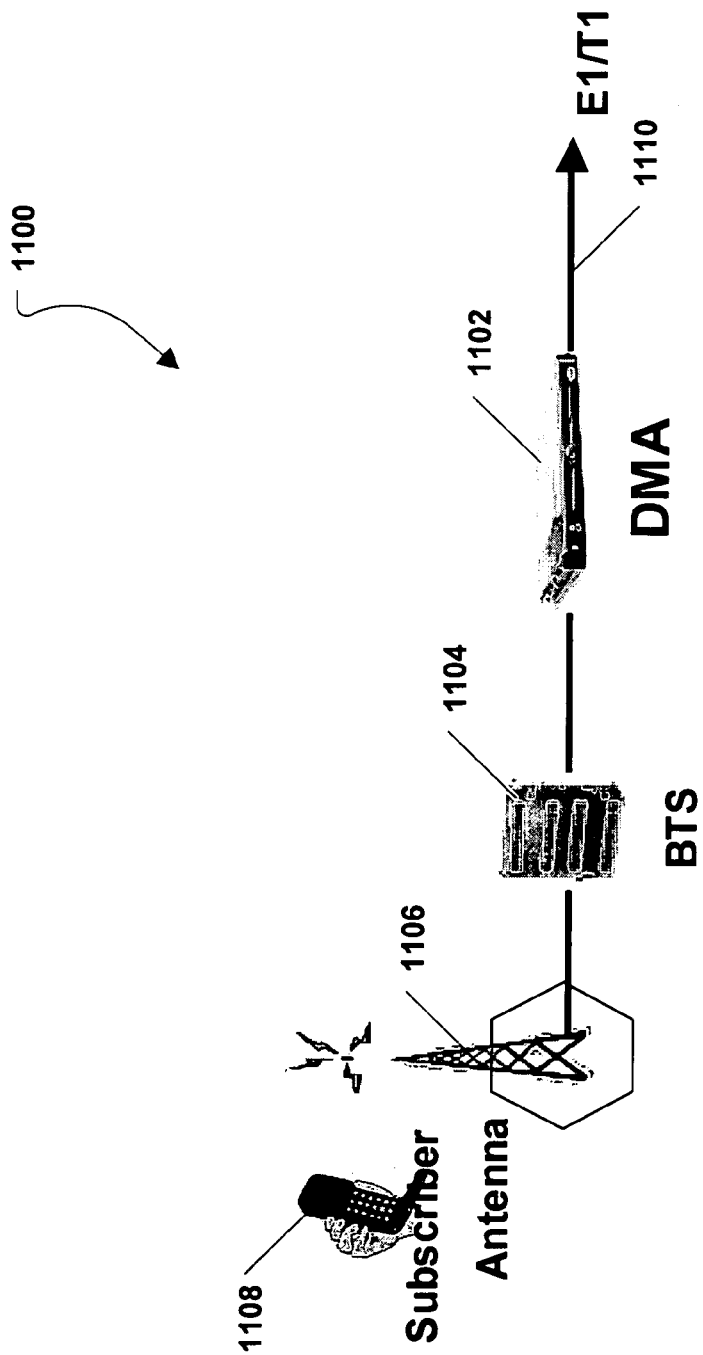
FIG. 11 is a diagram of a wireless local loop communication system in which a distributed management architecture server can be incorporated.

Referring to FIG. 11, a wireless local loop (WLL) system is portrayed and is generally designated 1100. As illustrated in FIG. 11, the system 1100 includes a DMA 1102 that is connected to a BTS 1104. The BTS 1104, in turn, is connected to an antenna 1106. The antenna 1106 provides cellular coverage for one or more subscribers 1108 within transmission distance of the antenna 1106. FIG. 11 indicates that the system 1100 can further include a data network connection 1110 from the DMA 1102. The data network connection 1110 can connect the DMA 1102 to the PSTN via an ISUP/ISDN signaling connection on an SS7 link set or a T1/E1 wireless connection. Further, the data network connection 1110 can be an IEEE 802.11 connection between the DMA 1102 depicted in FIG. 11 and other DMAs not shown. The DMA 1102 can beneficially utilize existing infrastructure used for cellular and SMS data services.

Figure 12:
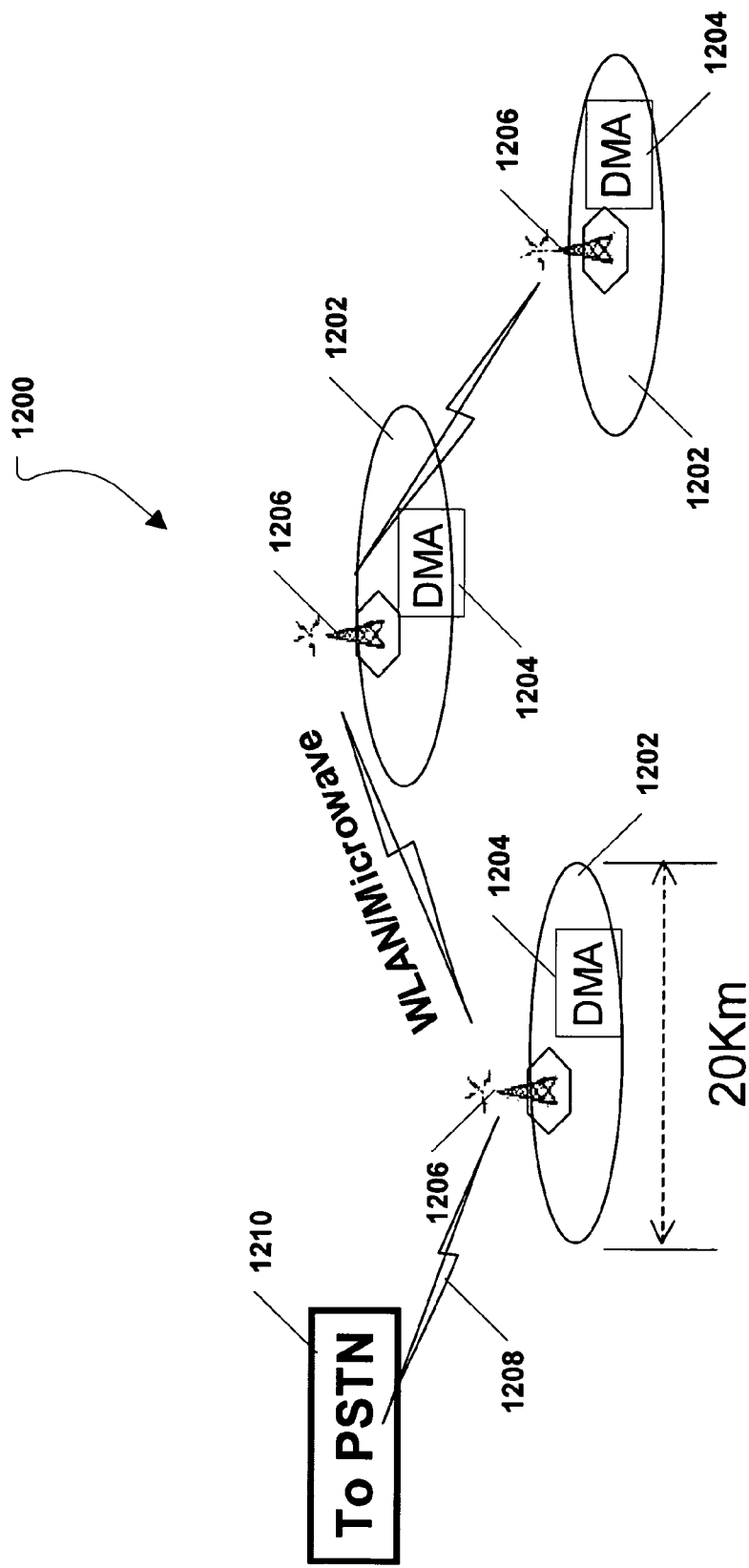
FIG. 12 is a diagram of plural wireless local loop communication systems connected to the public switched telephone network via a single back-haul connection.

FIG. 12 shows a multi-WLL system, generally designated 1200. As shown, the system 1200 includes a plurality of WLLs 1202. Each WLL 1202 can include a DMA 1204 and an antenna 1206 connected thereto to provide a cellular coverage site around the antenna 1206. As illustrated in FIG. 12, the WLLs 1202 can be interconnected via a wireless local area network (WLAN), or a wide area network, such as a microwave connection. Moreover, a DMA 1204 within one of the WLLs 1202 can provide a back-haul connection 1208 to the PSTN 1210. This type of deployment scenario can greatly reduce the costs associated with a wireless system. Since the DMAs 1204 are connected to each other via the WLAN or microwave connections, the relatively expensive inter-site back-haul component is removed. Further, using the hand-off logic, the DMAs 1204 can enable roaming between the WLLs 1202 and can further provide roaming to an external wireless or other network.

Figure 13:
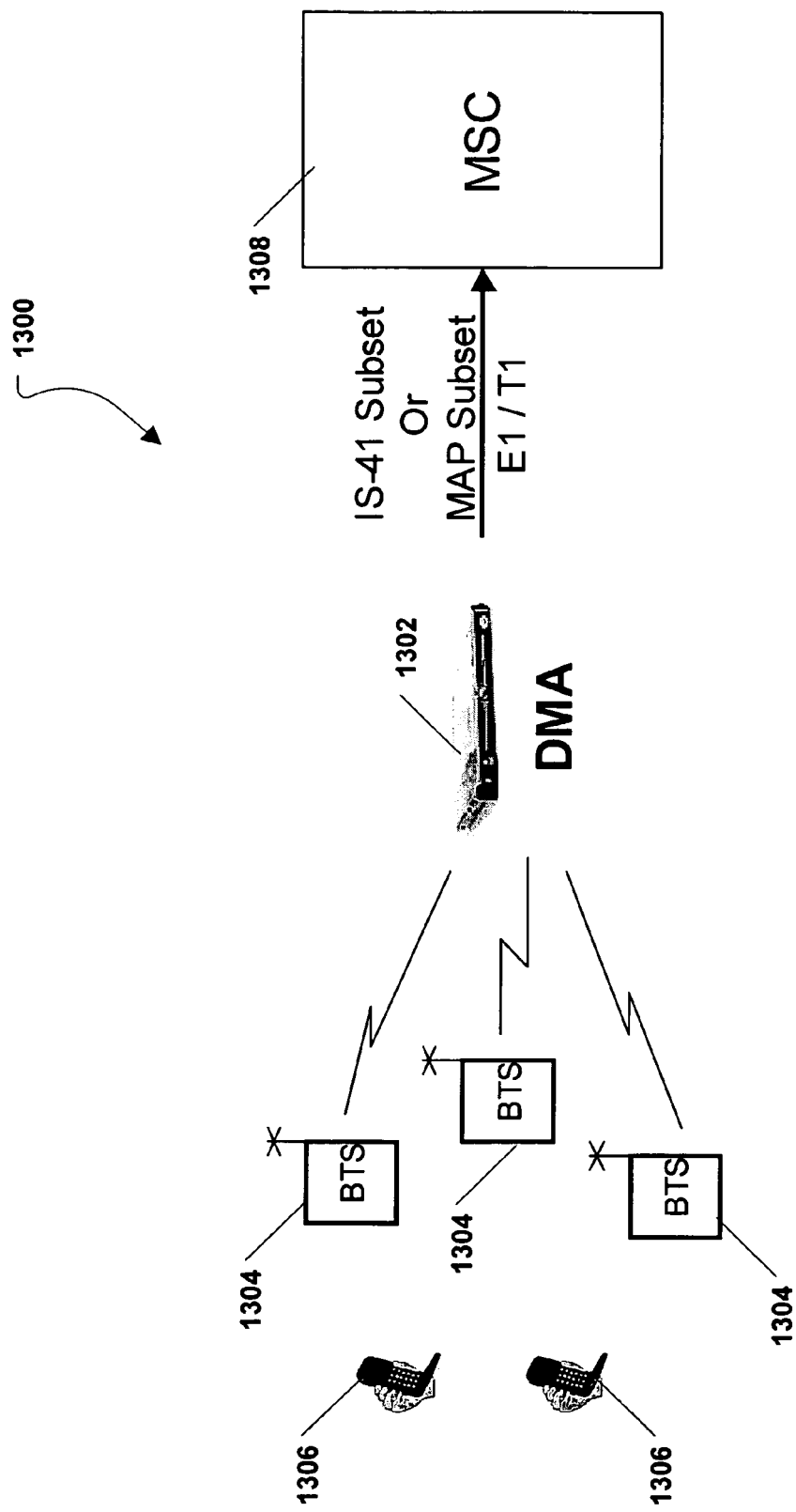
FIG. 13 is a diagram of a communication system in which a distributed management architecture server can be deployed to extend an existing cellular network.

Referring to FIG. 13, a telecommunications system is depicted and is designated 1300. As illustrated in FIG. 13, the system 1300 includes a DMA 1302 that can be connected to a plurality of BTSs 1304. Each BTS 1304 can provide cellular coverage for one or more mobile communication devices 1306, e.g., one or more mobile handsets configured to communicate via the DMA 1302. FIG. 13 further shows that the DMA 1302 can be connected to an MSC 1308, such as an MSC of an existing cellular system. The DMA 1302 can be connected to the MSC via an IS-41 subset or a MAP subset over a wireless E1/T1 connection. With this implementation, the DMA 1302 can extend an existing cellular network when connected to an existing cellular system MSC 1308.

Figure 14:
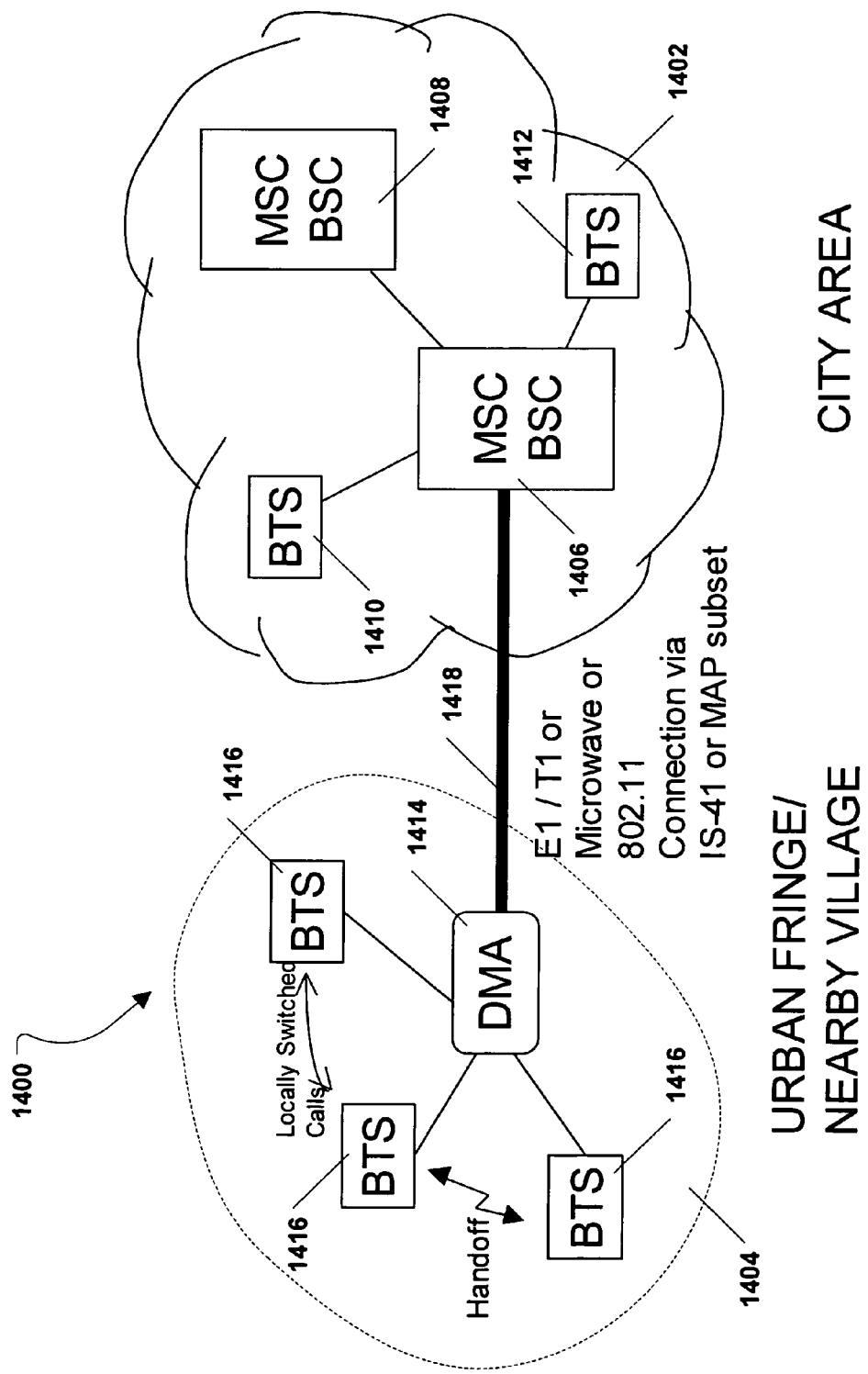
FIG. 14 is a diagram of a communication system in which a distributed management architecture server can be deployed to cover urban fringe around an existing network.

FIG. 14 shows an additional telecommunications system, generally designated 1400. As shown, the system 1400 includes a city area coverage site 1402 and an urban fringe/nearby village coverage site 1404. In an exemplary, non-limiting embodiment, the city area coverage site 1402 includes a first MSC/BSC center 1406 connected to a second MSC/BSC center 1408. Also, a first representative BTS 1410 and a second representative BTS 1412 are connected to the first MSC/BSC center 1406. The particular deployment of equipment is configured to provide adequate cellular coverage for mobile communication devices within the city area coverage site 1402.

As illustrated in FIG. 14, the urban fringe/nearby village coverage site 1404 includes a DMA 1414 having a plurality of BTSs 1416 connected thereto. The DMA 1414 can provide hand-off of calls between the BTSs 1416 and can switch calls made between the BTSs 1416 locally. However, the DMA 1414 within the urban fringe/nearby village coverage site 1404 can also connect telephony traffic to the first MSC/BSC center 1406 within the city area coverage site 1402 via a data network connection 1418. In one embodiment, the data network connection can be an E1 connection, a T1 connection, a microwave connection, or an 802.11 connection established via an IS-41 subset or MAP subset. The deployment of a DMA 1414 in a location such as that described above, i.e., in urban fringe or in a nearby village, and the connection of the DMA 1414 to an MSC/BSC center 1406 in a city area, can provide service to potential wireless customers that typically would not receive cellular coverage from the city area cellular coverage site 1402. Thus, new subscribers receive access to wireless communication service and can further communicate with wireless customers within the city area cellular coverage site 1402.

Figure 15:
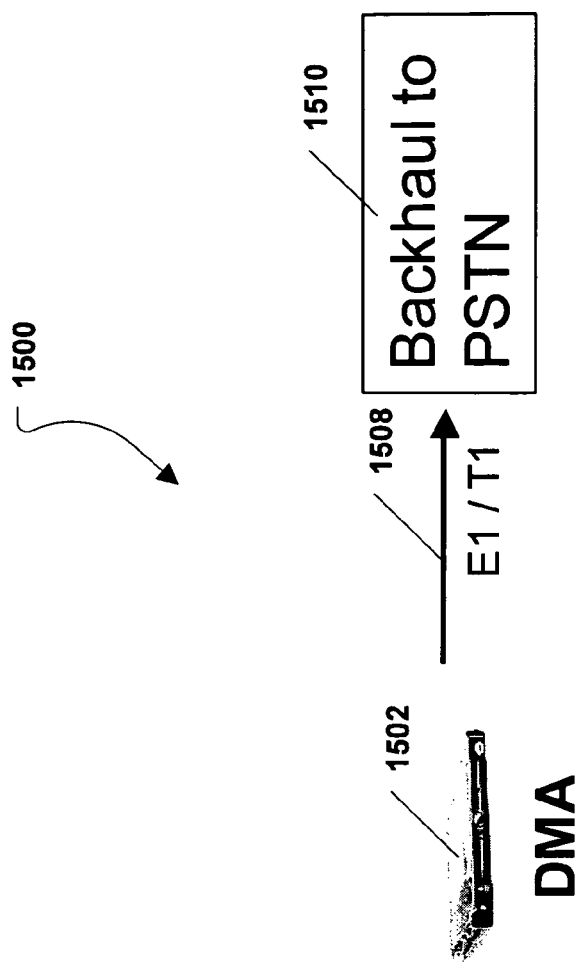
FIG. 15 is a diagram of a communication system in which a single distributed management architecture server can be connected to plural base transceiver stations and can provide a single backhaul to the public switched telephone network.
Figure 15:
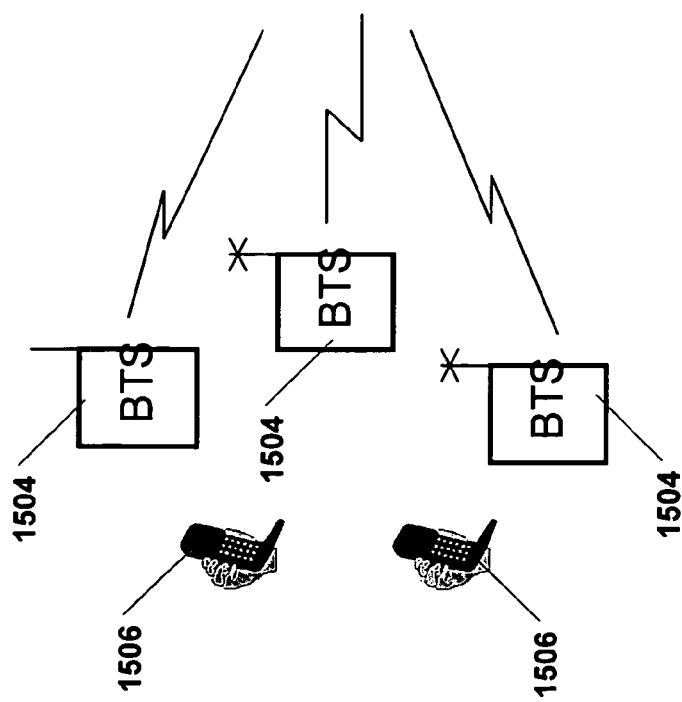

Referring now to FIG. 15, another telecommunications system is depicted and is designated 1500. As illustrated in FIG. 15, the system 1500 includes a DMA 1502 that can be connected to a plurality of BTSs 1504. Each BTS 1504 can provide cellular coverage for one or more mobile communication devices 1506. FIG. 15 further shows that the DMA 1502 can include a data network connection 1568 that provides a back-haul connection to the PSTN 1510. In one embodiment, the data network connection can be an E1 connection, a T1 connection, a cable connection, a microwave connection, or a satellite connection. Moreover, the system 1500 depicted in FIG. 15 can be deployed using CDMA IS-95, CDMA 1X, GSM/GPRS, W-CDMA, or other industry standard technologies.

Using a single back-haul connection greatly minimizes costs associated with the wireless communication network. Further, the system 1500 shown in FIG. 15 can be deployed relatively rapidly and can be maintained remotely. Additionally, with the inclusion of the OAMP module 540 (FIG. 5) and the AAA module 528 (FIG. 5), subscriber accounts can be managed locally and billing can be performed locally, i.e., within the DMA 1502. Moreover, as the number of subscribers increase, the size of the system can be increased modularly, e.g., by adding DMAs, corresponding BTSs, and the appropriate connections.

Figure 16:
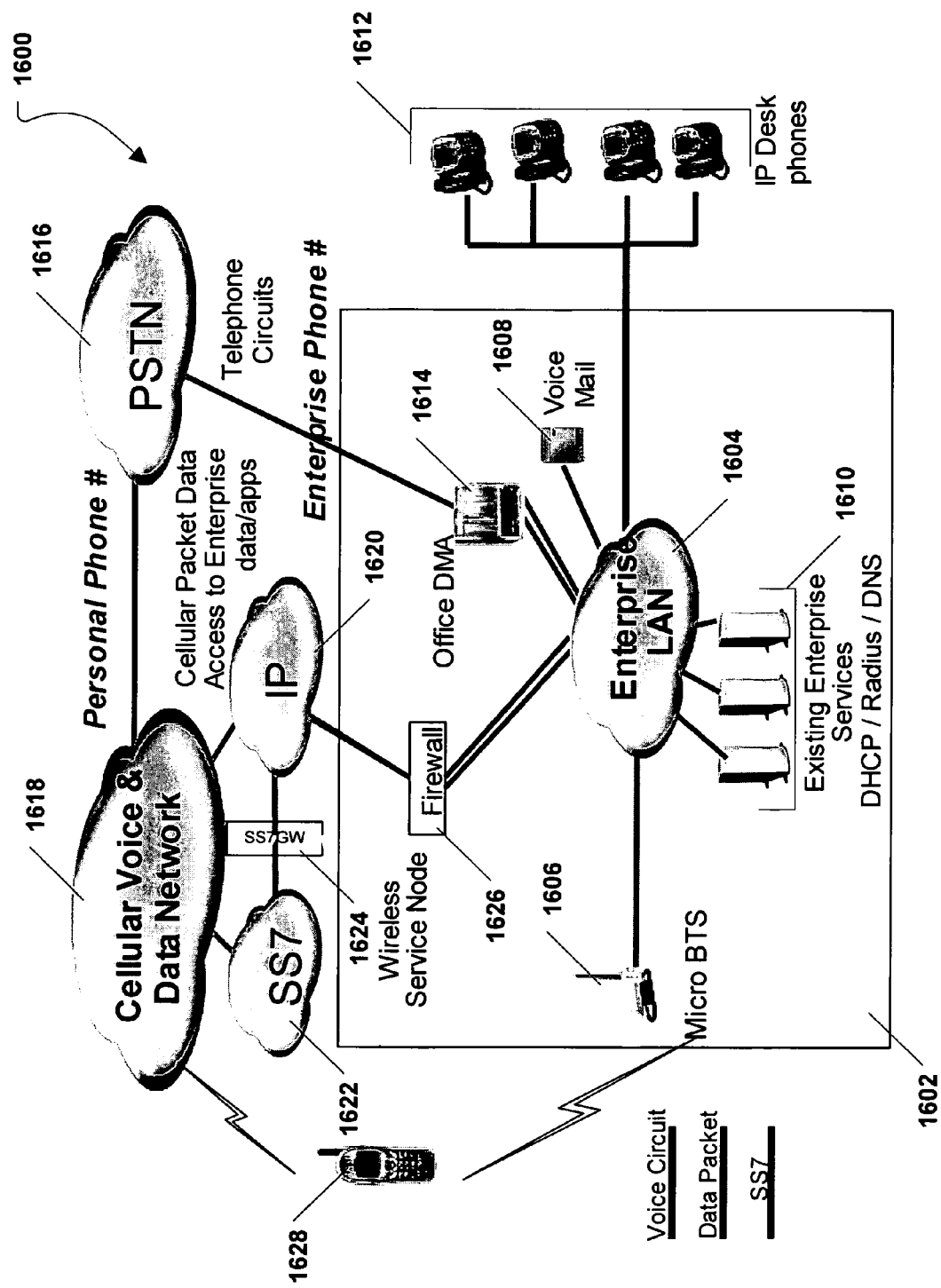
FIG. 16 is a diagram of an in-building communication system in which a distributed management architecture server can be deployed.

FIG. 16 illustrates an in-building telecommunications network that is generally designated 1600. FIG. 16 depicts a structure 1602, e.g., an office building, a commercial building, a house, etc. An enterprise local area network (LAN) 1604 is installed within the building 1602. A micro-BTS 1606 is connected to the enterprise LAN 1604. Moreover, a voice mail server 1608 and plural enterprise services servers 1610 are connected to the enterprise LAN 1604. In an exemplary, non-limiting embodiment, the enterprise services servers 1610 can include a dynamic host configuration protocol (DHCP) server, a radius server, a domain name server (DNS), etc. As depicted in FIG. 16, a plurality of phones 1612, e.g., IP desk phones can be connected to the enterprise LAN 1604.

FIG. 16 further indicates that an office DMA 1614 can be connected to the enterprise LAN 1604. The office DMA 1614 can also be connected to the PSTN 1616, which, in turn, can be connected to a cellular voice and data network 1618. The enterprise LAN 1604 can also be connected to the cellular voice and data network 1618 via an Internet protocol (IP) network 1620. A signaling system seven (SS7) network 1622 can be connected to the cellular voice and data network 1618 and the IP network 1620. FIG. 16 also depicts an SS7 gateway 1624 between the SS7 network 1622 and the IP network 1620 and a firewall 1626 between the enterprise LAN 1604 and the IP network 1620. FIG. 16 shows a wireless communication device 1628 in communication with the cellular voice and data network 1618 and the micro-BTS 1606.

Figure 17:
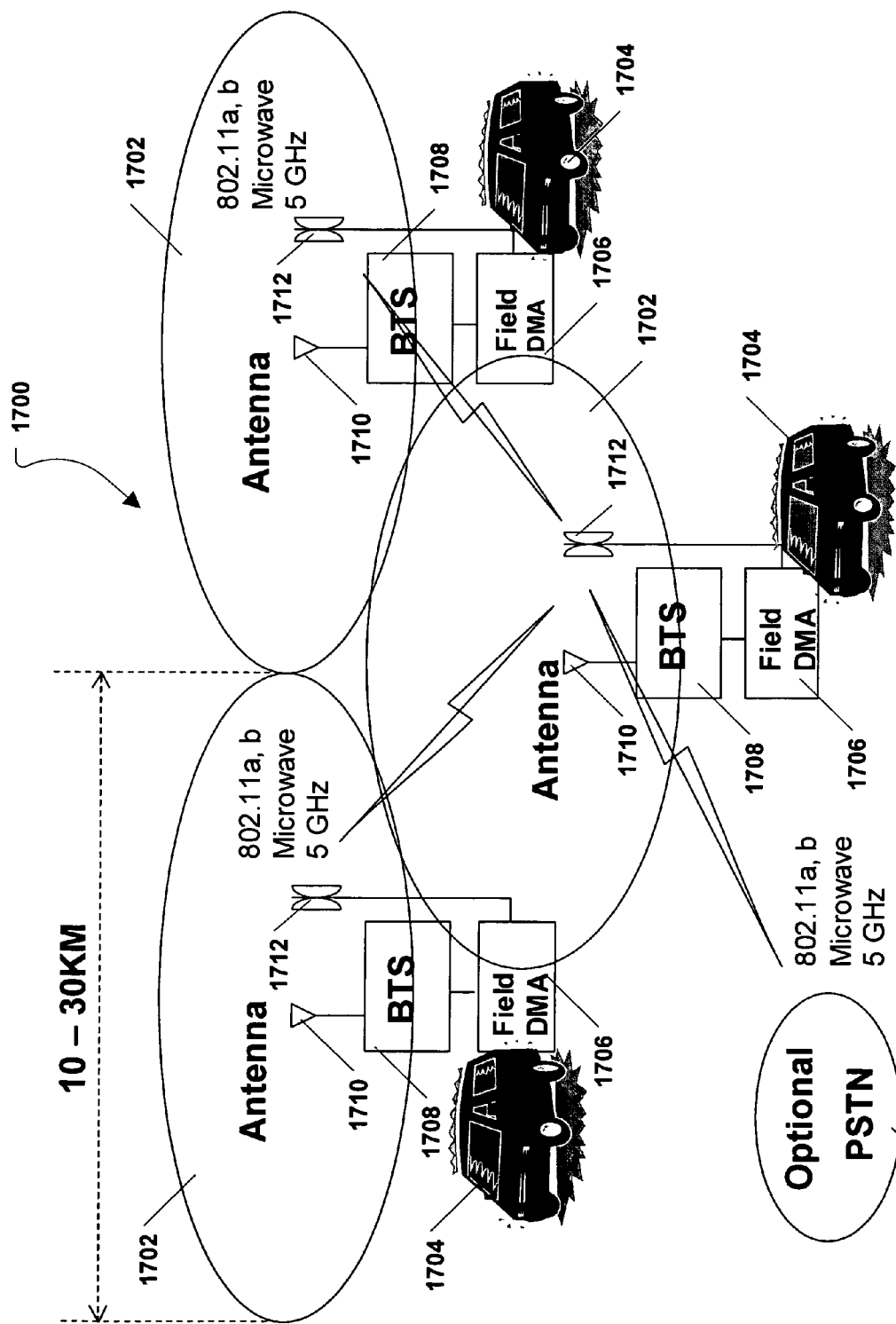
FIG. 17 is a diagram of a mobile in-field communication system in which multiple distributed management architecture servers can be deployed via multiple vehicles.

Referring to FIG. 17, a mobile in-field telecommunications system is depicted and is generally designated 1700. As depicted, the system 1700 includes a plurality of mobile cellular coverage sites 1702. Each mobile cellular coverage site 1702 includes a vehicle 1704 in which a field DMA 1706 is disposed. Moreover, a BTS 1708 is disposed within each vehicle 1704 and is in direct physical connection with the field DMA 1706, e.g., by a wire or cable connected there between. The field DMA 1706 and the BTS 1708 can be removably installed within the vehicle 1704 or permanently affixed therein. FIG. 17 further indicates that each BTS 1708 can include an antenna 1710 that is designed to communicate with mobile communication devices. Also, each field DMA 1706 includes an antenna 1712. In an exemplary, non-limiting embodiment, the field DMAs 1706 can communicate wirelessly with each other via the antennae 1712, e.g., via 802.11a, 802.11b, microwaves, or other wireless link.

The mobile cellular coverage sites 1702 can be deployed to provide a temporary web of cellular coverage for a plurality of mobile communication devices, e.g., devices carried by soldiers during a battle. The mobile in-field communications system 1700 can be recalled, moved, and re-deployed as necessary. Further, the system can include a wireless connection, e.g., 802.11a, 802.11b, microwaves, to the PSTN 1714.

Figure 18:
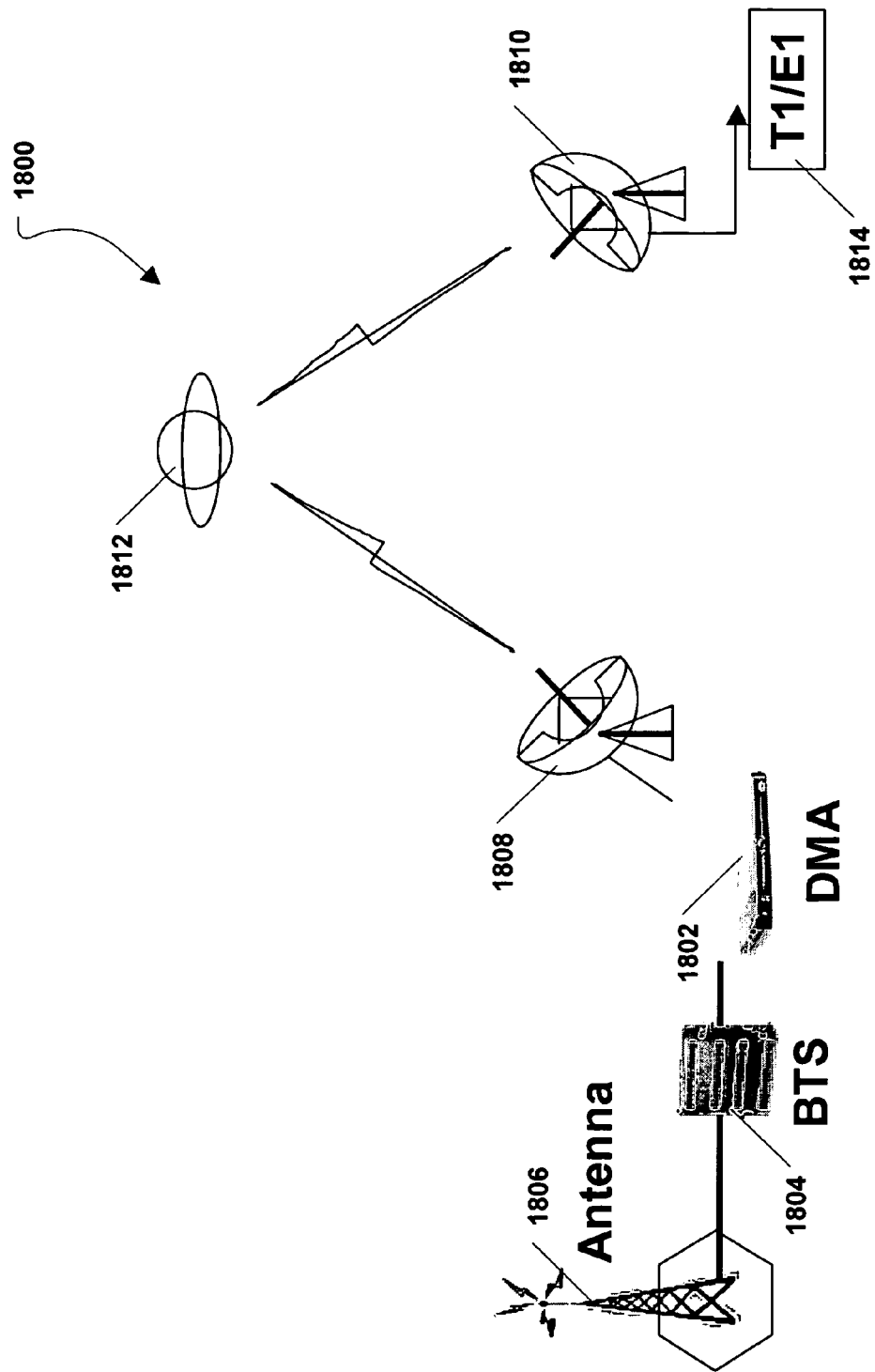
FIG. 18 is a diagram of a communication system in which a distributed management architecture server can utilize a satellite connection as a backhaul connection.

Referring to FIG. 18, still another telecommunications system is illustrated and is generally designated 1800. As depicted in FIG. 18, the system 1800 includes a DMA 1802 that is connected to a BTS 1804. The BTS 1804, in turn, is connected to an antenna 1806. FIG. 18 further illustrates that a first satellite transceiver 1808 is also connected to the DMA 1802. The first satellite transceiver 1808 communicates with a second satellite transceiver 1810 via a satellite 1812. Additionally, the second satellite transceiver 1810 includes a data network connection 1814, e.g., a T1 connection, or an E1 connection. The satellite transceivers 1808, 1810 and the satellite 1812 can provide a backhaul connection for the DMA 1802. Or, the satellite transceivers 1808, 1810 and the satellite 1812 can connect the DMA 1802 to an additional DMA (not shown).

Figure 19:
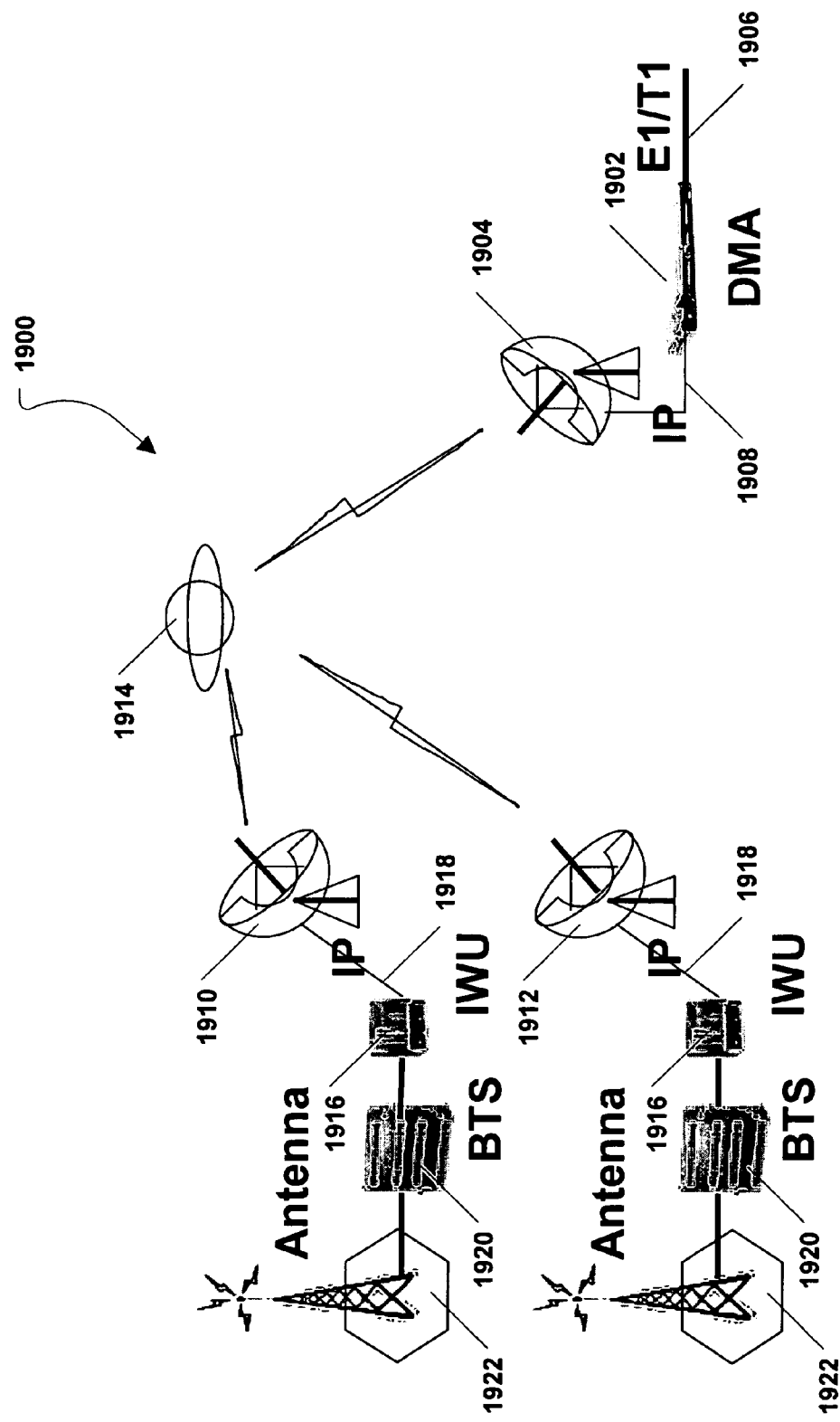
FIG. 19 is a diagram of a communication system in which a distributed management architecture server can receive multiple backhaul signals via multiple satellite signals.

FIG. 19 shows yet another telecommunications system that is generally designated 1900. As illustrated in FIG. 19, the system includes a DMA 1902 that is connected to a first satellite transceiver 1904. Moreover, the DMA 1902 includes a primary network connection 1906, e.g., a T1 connection, or an E1 connection, and a secondary network connection 1908, e.g., an IP connection. FIG. 19 shows that the first satellite transceiver 1904 communicates with a second satellite transceiver 1910 and a third satellite transceiver 1912 via a satellite 1914. Each of the second and third satellite transceivers 1910, 1912 is connected to an interworking unit (IWU) 1916 via a data network connection 1918, e.g., an IP connection. Each IWU 1916 is connected to a BTS 1920, which in turn, is connected to an antenna 1922. The satellite transceivers 1904, 1910, 1912 provide an IP network extension for the DMA 1902. Moreover, in the deployment illustrated in FIG. 19, the DMA 1902 can act as a centralized micro-switch for handling calls received at the antennas 1922 and transmitted via the second and third satellite transceivers 1910, 1912.

Figure 20:
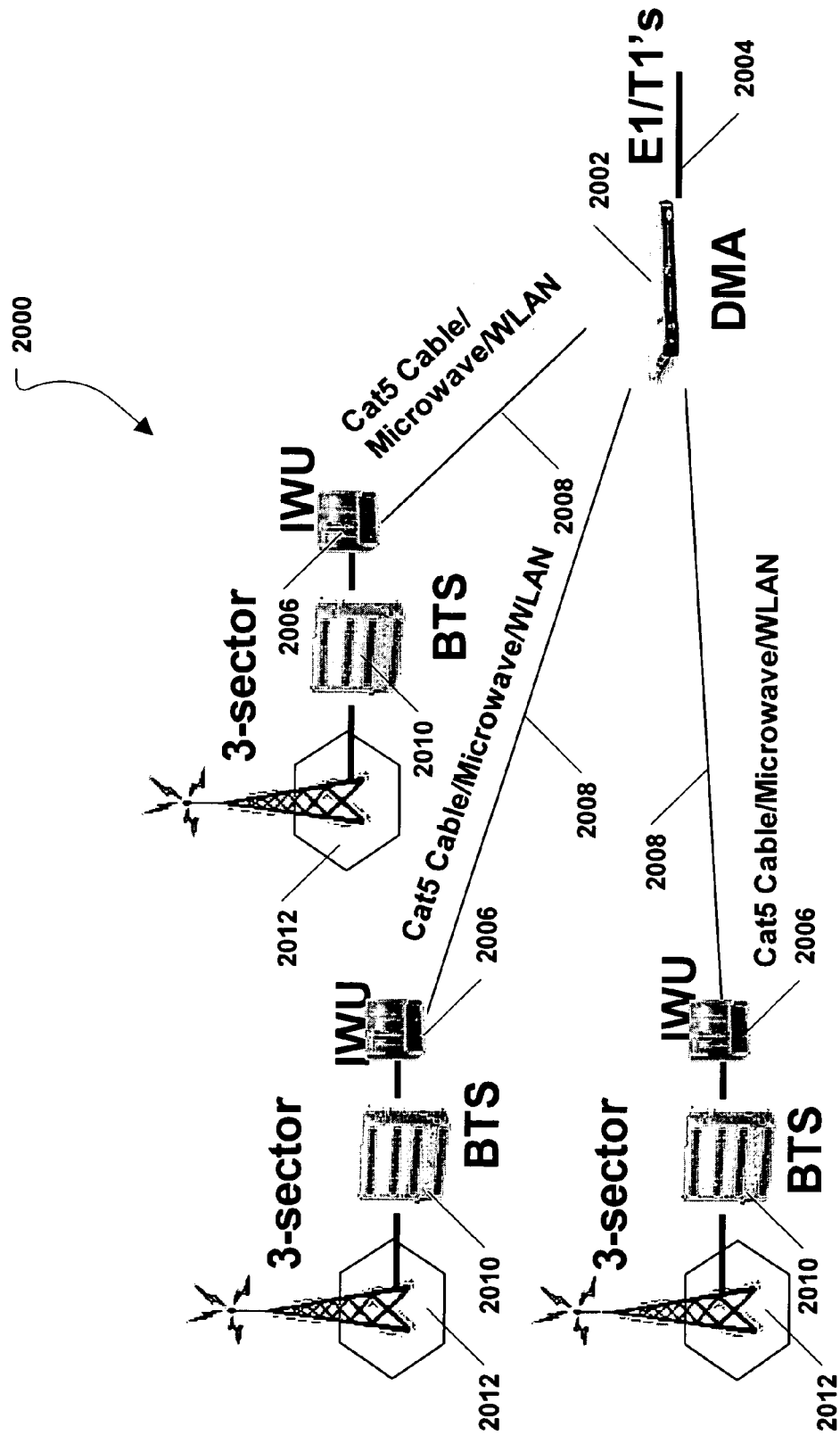
FIG. 20 is a diagram of a communication system in which a single distributed management architecture server can be connected to multiple base transceiver stations.

Referring to FIG. 20, another telecommunications system is depicted and is designated 2000. As shown, the system 2000 includes a DMA 2002 having a primary network connection 2004. Moreover, the DMA 2002 can be connected to a plurality of IWUs 2006. In an exemplary, non-limiting embodiment, the DMA 2002 can be connected to each IWU 2006 via a secondary network connection 2008, such as a category five (Cat 5) cable connection, a microwave connection, or a WLAN connection. Further, each IWU 2006 is connected to a BTS 2010 and each BTS 2010, in turn, is connected to an antenna 2012. Each BTS 2010 can be a 3-sector BTS. In the deployment depicted in FIG. 20, the DMA 2002 can act as a centralized micro-switch that can be used to handle telephony traffic received at the antennae 2012.

Figure 21:
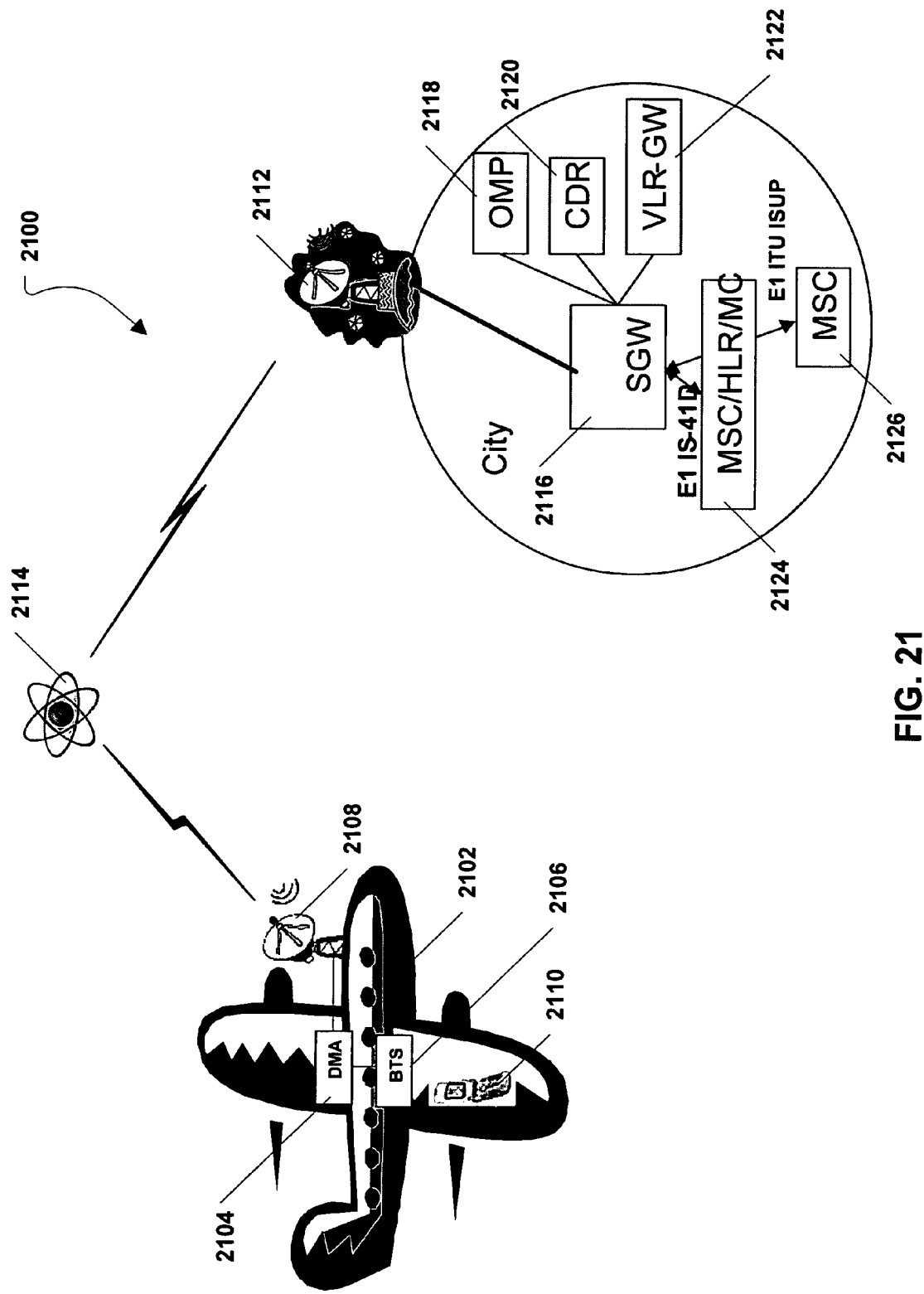
FIG. 21 is a diagram of a mobile communication system in which a distributed management architecture server can be deployed via an airplanes.

FIG. 21 illustrates yet another embodiment of a communications system, designated 2100. As shown, the system 2100 includes an airplane 2102 in which a DMA 2104 is installed. As shown, the DMA 2104 is coupled to a BTS 2106 and a first satellite transceiver 2108. FIG. 21 also shows a mobile communication device 2110 within the airplane 2102. The mobile communication device 2110 can be in wireless communication with the BTS 2106.

In a particular embodiment, the first satellite transceiver 2108 can communicate with a second satellite transceiver 2112 via a satellite 2114. As shown, the second satellite transceiver 2112 can be connected to a terrestrial server gateway 2116, e.g. a DMA gateway, that can provide connectivity to operations and management platform (OMP) 2118, a call detail record (CDR) 2120, and a visitor location register gateway (VLR-GW) 2122. The OMP 2118, the CDR 212, and the VRL-GW 2122 can be separate from or incorporated within the server gateway 2116. FIG. 21 further shows that the server gateway 2116 can be connected to a first mobile switching center (MSC) 2124 that is coupled to a second MSC 2126.

Accordingly, the system 2100 shown in FIG. 21 can allow a user in the airplane 2102 to communicate with a ground based telephone. For example, the mobile communication device 2110 can communicate with the BTS 2106, which, in turn, can communicate with the first satellite transceiver 2108 via the DMA 2104. Further, the first satellite transceiver 2108 can transmit the call to a ground based communication system via the second satellite transceiver 2112 and the satellite 2114.

FIG. 21 shows a single airplane, however, multiple airplanes can be configured as described herein to provide communication from multiple airplanes to ground based telephones. Further, airplane-to-airplane communication can be provided. Additionally, the system 2100 can include other airborne vehicles, e.g., blimps.

Figure 22:
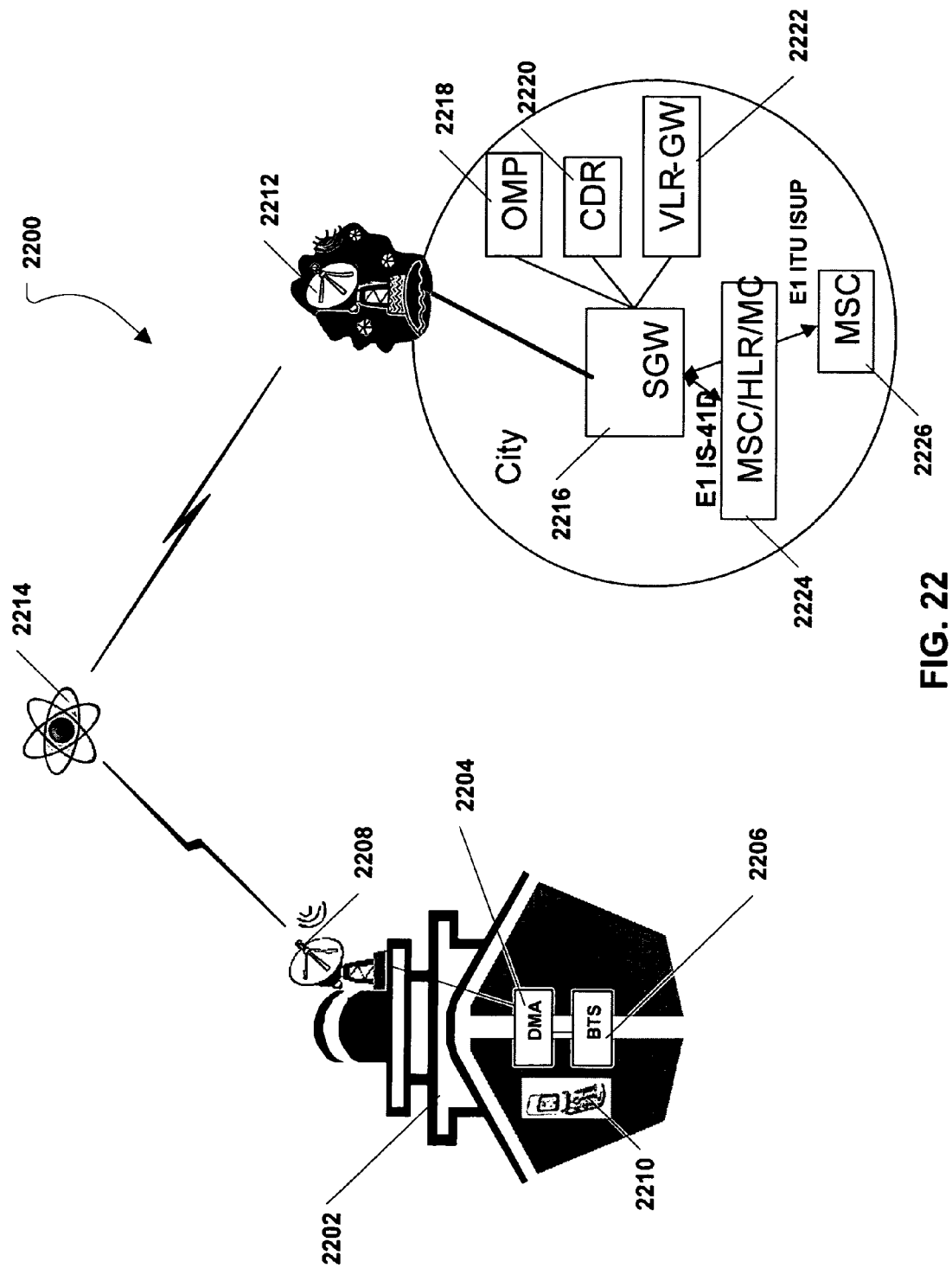
FIG. 22 is a diagram of a mobile communication system in which a distributed management architecture server can be deployed via a ship.

FIG. 22 illustrates yet another embodiment of a communications system, designated 2200. As shown, the system 2200 includes a ship 2202 in which a DMA 2204 is installed. As shown, the DMA 2204 is coupled to a BTS 2206 and a first satellite transceiver 2208. FIG. 22 also shows a mobile communication device 2210 within the ship 2202. The mobile communication device 2210 can be in wireless communication with the BTS 2206.

In a particular embodiment, the first satellite transceiver 2208 can communicate with a second satellite transceiver 2212 via a satellite 2214. As shown, the second satellite transceiver 2212 can be connected to a terrestrial server gateway 2216, e.g. a DMA gateway, that can provide connectivity to operations and management platform (OMP) 2218, a call detail record (CDR) 2220, and a visitor location register gateway (VLR-GW) 2222. The OMP 2218, the CDR 222, and the VRL-GW 2222 can be separate from or incorporated within the server gateway 2216. FIG. 22 further shows that the server gateway 2216 can be connected to a first mobile switching center (MSC) 2224 that is coupled to a second MSC 2226.

Accordingly, the system shown in FIG. 2200 can allow a user within the ship 2202 to communicate with a ground-based telephone. For example, the mobile communication device 2210 can communicate with the BTS 2206, which, in turn, can communicate with the first satellite transceiver 2208 via the DMA 2204. Further, the first satellite transceiver 2208 can transmit the call to a ground based communication system via the second satellite transceiver 2212 and the satellite 2214.

FIG. 22 shows a single ship, however, multiple ships can be configured as described herein to provide communication from multiple ships to ground based telephones. Further, ship-to-ship communication can be provided. Additionally, the system 2200 can include other waterborne vehicles.

Figure 23:
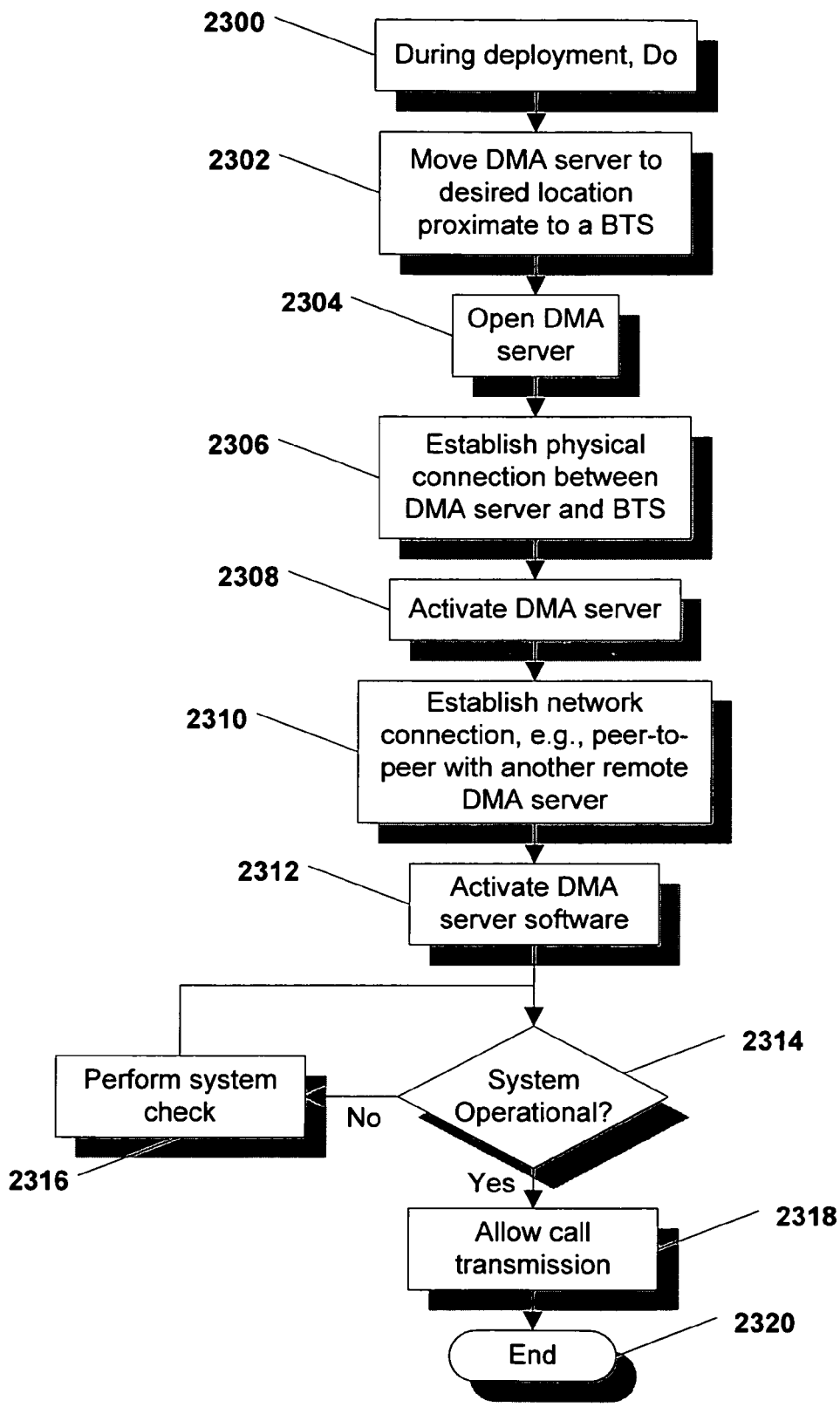
FIG. 23 is a flow chart to illustrate a method of deploying a distributed management architecture server.

Referring to FIG. 23, a method of deploying a distributed management architecture server is shown and commences at block 2300 wherein during deployment, the succeeding steps are performed. At block 2302, the DMA is moved to a desired location proximate to a BTS. Moving to block 2304, the DMA is opened. For example, if the DMA is the DMA shown in FIG. 1, the latch is unlocked and the lid is rotated about the hinges into the open position. Proceeding to block 2306, a physical connection is established between the DMA and the BTS, e.g., the BTS is coupled to the DMA via a wire.

Continuing to block 2308, the DMA is activated, e.g., powered on. At block 2310, a network connection is established with another remote DMA. In a particular embodiment, the network connection is a peer-to-peer connection between the DMAs. Moving to block 2312, DMA software within the DMA is activated. Thereafter, at decision step 2314, it is determined whether the system is operational. That decision can be a performed by the DMA, e.g., by a self-diagnostic routine or module within the DMA. Alternatively, that decision can be determined manually by a technician. If the system is not operational, a system check is performed at step 2316. In a particular embodiment, the system check performed at step 2316 is performed by a self-diagnostic routine or module within the DMA. On the other hand, a technician can perform the system check. After the system check, the logic then returns to decision step 2314 and continues as described herein. At decision step 2314, if the system is operational, the method proceeds to block 2318 and call transmission is allowed. The method then ends at state 2320.

Figure 24:
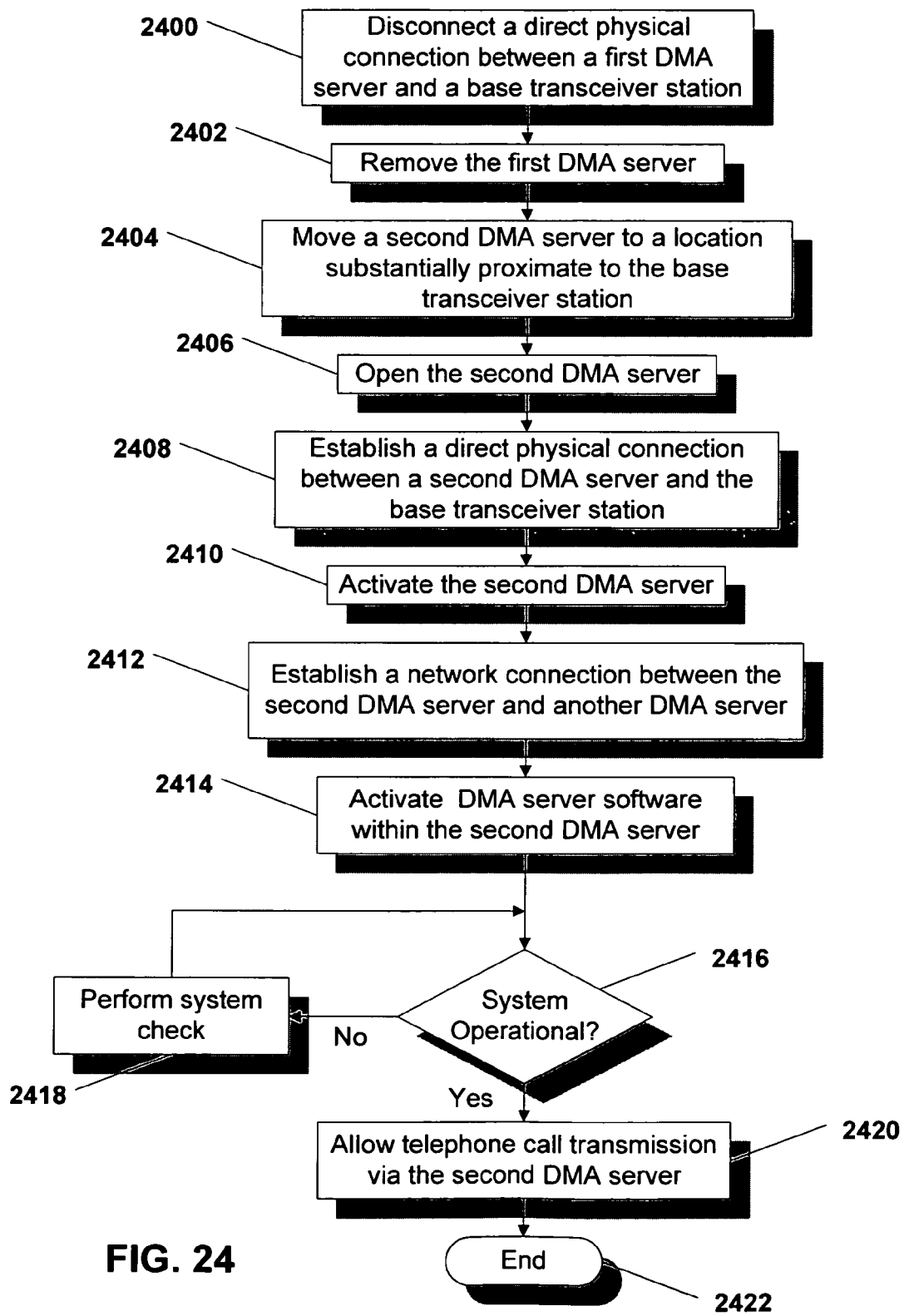
FIG. 24 is a flow chart to illustrate a method of replacing a distributed management architecture server.

Referring to FIG. 24, a method of deploying a distributed management architecture server is shown and commences at step 2400 wherein a direct physical connection between a first DMA and a base transceiver station is disconnected. At 2402, the first DMA is removed. Proceeding to step 2404, a second DMA is moved to a location that is substantially proximate to the base transceiver station. At 2406, the second DMA is opened. For example, if the DMA is the DMA shown in FIG. 1, the latch is unlocked and the lid is rotated about the hinges into the open position. Next, at 2408, a direct physical connection is established between the second DMA and the base transceiver station.

Continuing to block 2410, the second DMA is activated. At block 2412, a network connection is established between the second DMA and another remote DMA. In a particular embodiment, the network connection is a peer-to-peer IP connection between the DMAs. Further, in a particular embodiment, the peer-to-peer connection is established via a private IP network. At block 2414, DMA software within the second DMA is activated.

Proceeding to decision step 2416, it is determined whether the system is operational. That decision can be a performed by the second DMA, e.g., by a self-diagnostic routine or module within the second DMA. Alternatively, the decision can be determined manually by a technician. If the system is not operational, a system check is performed at block 2418. In a particular embodiment, the system check performed at block 2418 is performed by a self-diagnostic routine or module within the second DMA. On the other hand, a technician can perform the system check. After the system check, the logic then returns to decision step 2416 and continues as described herein. At decision step 2416, if the system is operational, the method proceeds to block 2420 and call transmission is allowed via the second DMA. The method then ends at state 2422.

Referring to FIG. 25, a communication system that includes a network of distributed mobile architecture nodes is shown. As illustrated, the communication system includes a first distributed mobile architecture (DMA) node 2500, a second DMA node 2502, and a third DMA node 2504. In an illustrative embodiment, the first DMA node 2500 is coupled to the second DMA node 2502 via a communication link 2514. The first DMA node 2500 is coupled to the third DMA node 2504 via a second communication link 2516. Also, the second DMA node 2502 is coupled to the third DMA node 2504 via a third communication link 2518. In a particular embodiment, each of the communication links may be implemented as Internet protocol (IP) data communication links in a peer-to-peer data network.

FIG. 25 also indicates that the first DMA node 2500 coupled to a mobile switching center (MSC) element 2540 of a cellular communication system. For example, the first DMA node 2500 can be coupled to the mobile switching center (MSC) 2540 via a connection 2542. In addition, the first DMA node 2500 can be coupled to a visitor location register gateway (VLR-GW) 2550 over the communication link 2542.

In an illustrative embodiment, the first DMA node 2500 supports wireless communication with mobile stations such as the identified mobile stations 2510 and 2512 shown in FIG. 25. Similarly, the second DMA node 2502 supports wireless communication with exemplary mobile stations 2520 and 2522. As a further example, the third DMA node 2504 supports wireless communication with mobile stations, such as the identified mobile stations 2530, 2532, and 2534. In a particular illustrative embodiment, one of the mobile stations 2530, 2532, and 2534 that is supported by the third DMA node 2504 is a visiting and roaming mobile station. In this particular example, the mobile station 2530 may be a portable communication device, such as an electronic device suitable for wireless communications that may be in a roaming state. For example, the mobile station 2530 may be implemented as a cellular phone that has a home DMA node other than the third DMA node 2504.

As a particular example, the mobile station 2530 may have a home DMA outside of the illustrated DMA network. Further, the roaming user of the mobile station 2530 may have moved their location to be in close proximity with the third DMA node 2504. The visitor location register gateway (VLR-GW) 2504 that is coupled to the first DMA node 2500 and to the mobile switching center 2540 of the wide area cellular network may be used to register visiting mobile devices, such as the mobile station 2530. In a particular embodiment, the VLR-GW 2550 may identify a plurality of visiting mobile stations and may provide information, such as the identity of the mobile station and the location of the particular DMA that is supporting the visiting mobile station. As a particular example, Table 1 below illustrates registration information for mobile stations that may be stored within the VLR-GW 2550.

TABLE 1

Exemplary Visitor Location Register

|  | IMSI | ESN | LOC |
| --- | --- | --- | --- |
| Mobile Station (2510) | IMSIa | ESNa | @DMA1 |
| Mobile Station (2530) | IMSIb | ESNb | @DMA3 |

In a particular embodiment, while the VLR-GW 2550 is illustrated as a separate element, it should be understood that the VLR-GW 2550 may be stored within a memory, such as a computer readable memory that is disposed within a module within the first DMA node 2500. Thus, the VLR-GW 2550 is illustrated as a separate element to show the functionality of the VLR-GW and its coupling to the MSC 2540. Also, in a particular embodiment, the visiting location register within the VLR-GW 2550 may include a first item to identify a first visiting mobile subscriber unit, a second item to identify an address of a first of a plurality of a distributed mobile architecture (DMA) nodes of a distributed Internet protocol network, a third item to identify a second visiting mobile subscriber unit, and a fourth item to identify a second of the DMA nodes of the distributed Internet protocol network. Also, in a particular exemplary embodiment, the first of the distributed mobile architecture nodes can be wirelessly coupled to communicate with a first visiting mobile subscriber unit and the second of the DMA nodes can be wirelessly coupled to communicate with a second visiting mobile subscriber unit.

During operation, a mobile subscriber, such as the roaming mobile subscriber 2530, may roam from an area that is outside access to the particular DMA network and may subsequently move into proximity with a particular DMA node such as the third DMA node 2504. Thereafter, the mobile subscriber that is visiting, such as mobile subscriber 2530, can register as a visitor in the visitor location register (VLR) of the third DMA node 2504. Additionally, the visiting mobile subscriber can store the DMA location information in the VLR-GW 2550. For example, the third DMA node 2504 may send a message over the communication link 2516 to the first DMA node 2500 and that message is forwarded, as shown at 2564, as information stored within the VLR-GW 2550. The stored information may include the DMA location (i.e. an address) and the identity information of the mobile subscriber 2530. An example of the identity information includes an electronic serial number (ESN) or international mobile subscriber identity (IMSI).

After the mobile subscriber 2530 has provided registration information, a routing request message is presented to the VLR-GW 2550 from outside the DMA network. For example, a home location register may provide a routing request message to the VLR-GW 2550 via the MSC 2540. The VLR-GW 2550 sends a message to the third DMA node 2504, such as illustrated by message 2562, and receives an acknowledgement from the third DMA node 2504, provided to the MSC 2540 for relay back to the HLR of the cellular network, as shown at 2566.

Figure 26:
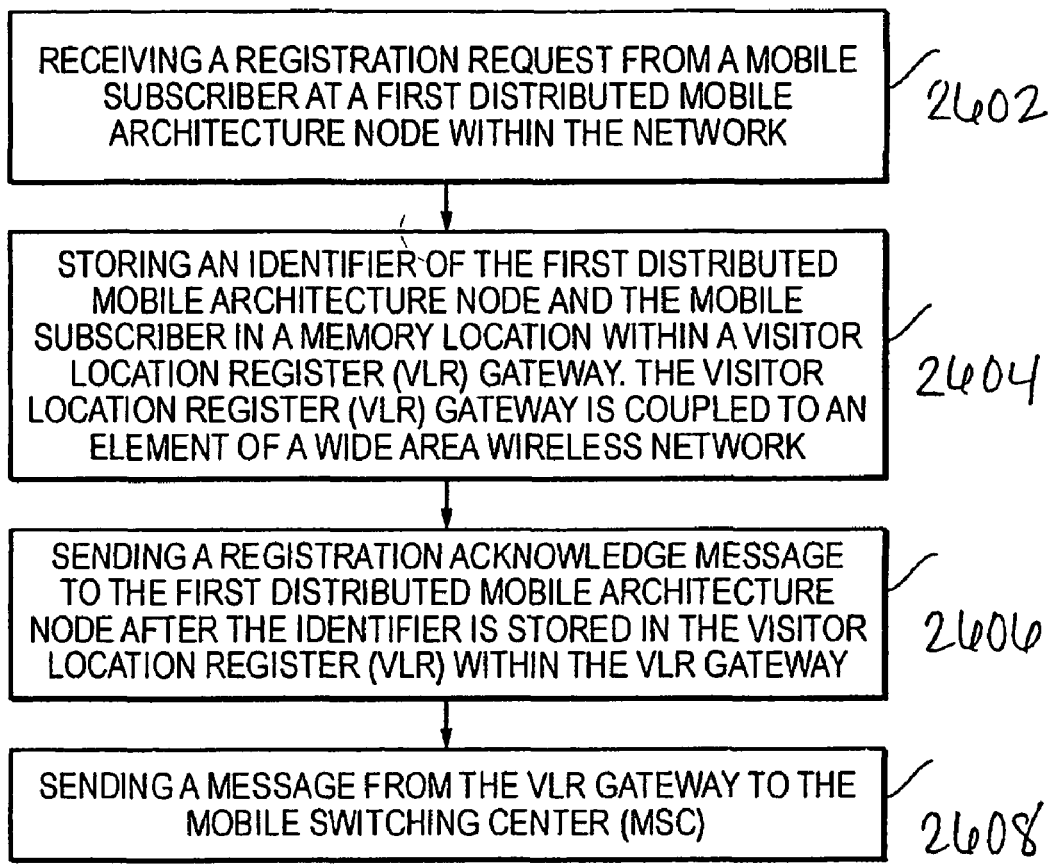
FIG. 26 is a flow chart to illustrate a method of registering a mobile subscriber within a network of distributed mobile architectures.

Referring to FIG. 26, a particular illustrative method of registering a mobile subscriber within a network including DMA nodes, such as the network shown in FIG. 25 is illustrated. The method of registering a mobile subscriber with a network includes receiving a registration request from a mobile subscriber at a first DMA node within the network at block 2602. The method further includes storing and identifying a first distributed mobile architecture node and the mobile subscriber in a memory location within a visitor location register (VLR) gateway at block 2604. In a particular embodiment as shown in FIG. 25, the VLR gateway 2550 can be coupled to an element of a wide area wireless network, such as a mobile switching center 2540 and/or a home location register (HLR). FIG. 26 illustrates that the method further includes sending a registration acknowledgement message to the first DMA node after the identifier is stored in the visitor location register (VLR) within the VLR gateway at block 2606. The method further includes sending a message from the VLR gateway to the mobile switching center element of the wide area wireless network at block 2608. Thus, a method of registering a mobile subscriber unit within a visitor location register using a distributed DMA network has been shown.

Figure 27:
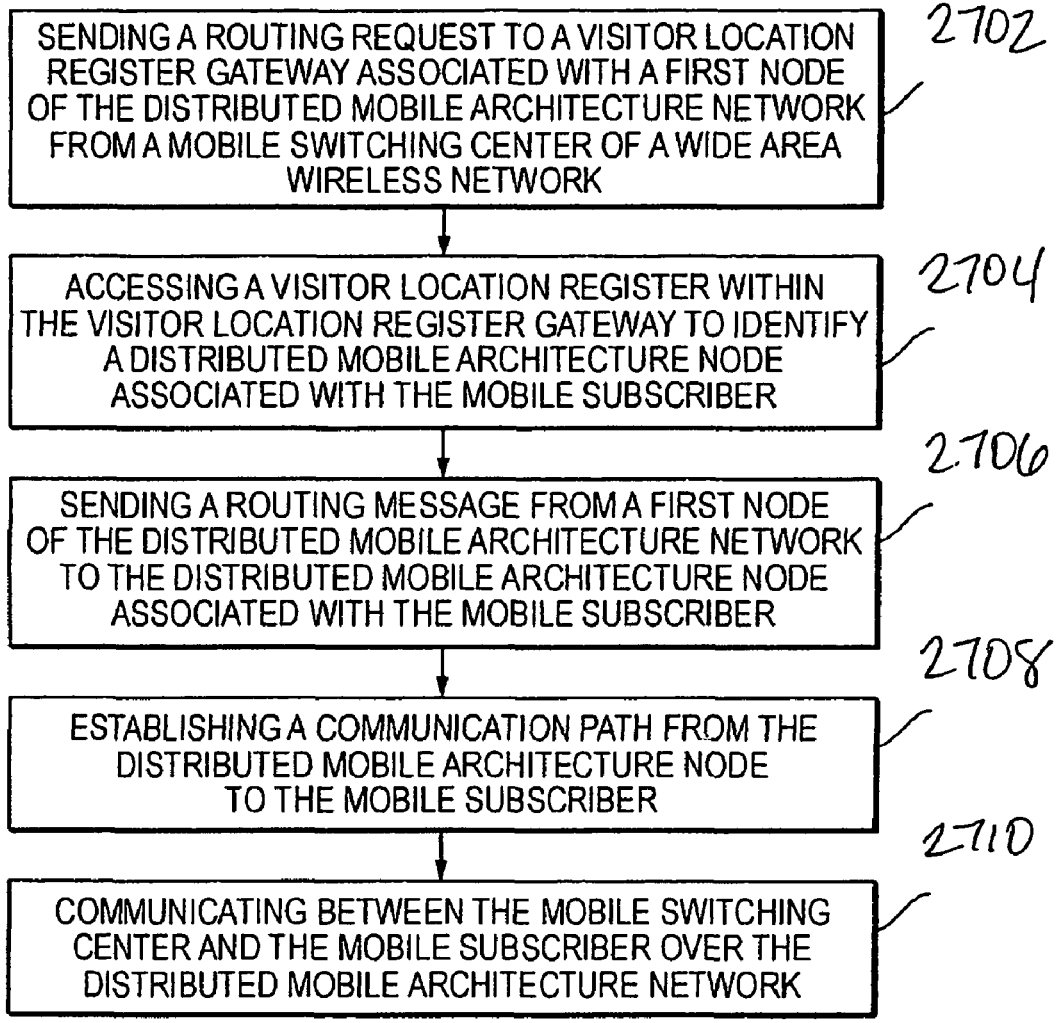
FIG. 27 is a flow chart to illustrate a method of routing a call from a wide area wireless network to a mobile subscriber.

Referring to FIG. 27, a method of routing a call from a wide area wireless network to a mobile subscriber via a DMA network is shown. The method includes sending a routing request to a VLR gateway associated with a first node of the DMA network from a mobile switching center of the wide area wireless network, as shown at 2702. The method further includes accessing a VLR within the VLR gateway to identify a DMA node associated with a mobile subscriber at block 2704. The method further includes sending a routing message from the first node of the DMA network to the DMA node associated with the mobile subscriber at block 2706. For example, with reference to FIG. 25, the message may be sent from a first DMA node 2500 that has access to the VLR gateway 2550 to the third DMA node 2504 that supports wireless communication with the roaming mobile subscriber unit 2530.

In a particular embodiment, the method further includes establishing a communication path from the DMA node to the mobile subscriber at block 2708. For example, a communication path may be established or may be updated between the third DMA node 2504 and the mobile subscriber 2530. The method further includes communicating between the mobile switching center of the wide area network and the mobile subscriber over the DMA network including the particular DMA nodes at block 2710.

In a particular embodiment, the visitor location register (VLR) is disposed within an authentication, authorization, and accounting module within the first node of the distributed mobile architecture network, such as the first DMA node 2500. While in the particular embodiment illustrated in FIG. 25, the roaming mobile subscriber 2530 is wirelessly coupled to the third DMA node 2504, it should be understood that each of the DMAs 2500, 2502, 2504 within the DMA network may communicate wirelessly with roaming mobile subscriber units, and such roaming mobile subscribing units may be registered within the VLR-GW 2550. In a particular illustrative embodiment, a registration acknowledgement message may be sent to the first DMA node 2500 after the identifier of the mobile subscriber is stored within the VLR-GW 2550. Also, the identifier or identifiers of the roaming mobile station may be forwarded from the VLR gateway 2550 to an HLR of the wireless wide area network. Also, the VLR gateway 2550 may be disposed within a module of the first DMA node 2500 and the first DMA node 2500 may receive a confirmation response with respect to the VLR gateway 2550 in its response to a message sent to the mobile switching center, such as the registration message sent in response to detecting a visiting mobile subscriber by a node of the DMA network. Further, the first DMA node 2500 may forward a registration acknowledgement message to the third DMA node 2504 after receiving a confirmation response from the mobile switching center (MSC) 2540.

Figure 28:
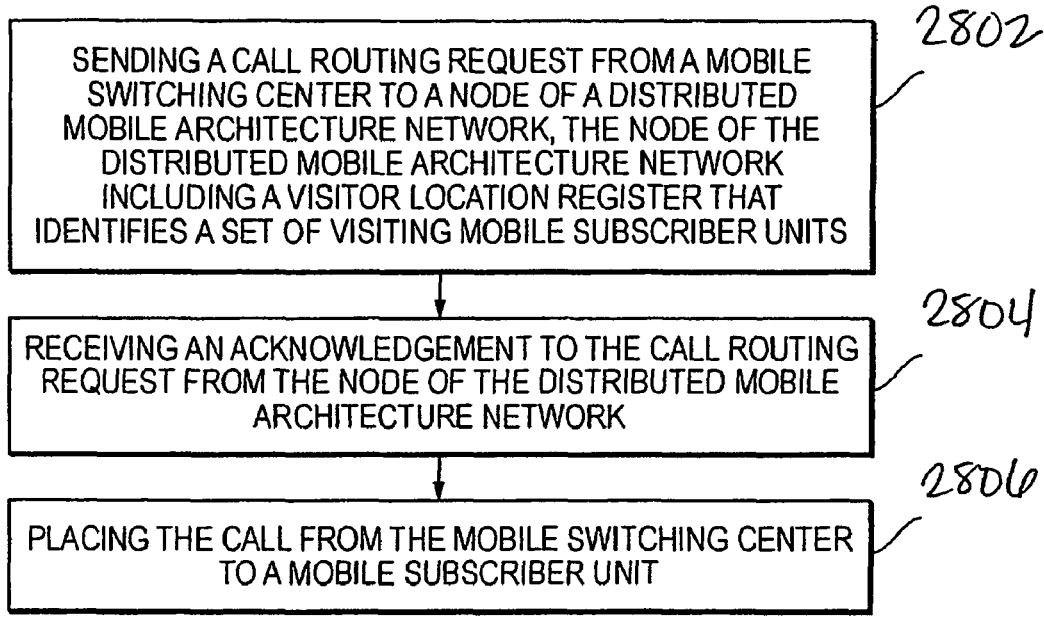
FIG. 28 is a flow chart to illustrate a method of placing a call to a roaming mobile subscriber visiting a node of a network of distributed mobile architectures.

Referring to FIG. 28, a method of placing a call to a roaming mobile subscriber that is visiting a node of a DMA network is shown. The method includes sending a call routing request from a mobile switching center to an assigned node of the DMA network that includes a visitor location register (VLR) to identify a set of visiting mobile subscriber units at block 2802. The method further includes receiving an acknowledgement to the call routing request from a serving node of the DMA network at block 2804, and placing the call from the mobile switching center to a particular mobile subscribing unit, via the serving DMA node, at block 2806.

In a particular embodiment, the mobile subscriber unit is a roaming mobile subscriber unit that is identified as within the set of visiting mobile subscriber units within the VLR. In another particular illustrative embodiment, the serving node of the DMA network may include a housing, a mobile switching center module disposed within the housing, and a base station controller module disposed within the housing. For example, the serving node of the DMA network may be implemented as shown with reference to FIG. 3. In addition, each node of the DMA network may be coupled to other nodes within the DMA network via a peer-to-peer IP data connection. Thus, a distributed data network may be utilized to provide call registration and routing to visiting mobile subscriber units that are located outside their home territory. In addition, the distributed mobile architecture network may provide access to a wide area network, such as a cellular network that includes mobile switching centers and home location registers.

With the configuration of structure described above, the present disclosure provides a flexible telecommunications device, i.e., a DMA, that is distributive and associative, i.e., it can operate stand-alone or seamlessly within an existing cellular or other network. Moreover, the DMA can be integrated with virtually any third party base station. The DMA can operate with multiple air interfaces including CDMA IS-95, CDMA 1X, CDMA EVDO, GSM, GPRS, W-CDMA, 802.11 (Wi-fi), 802.16 (Wi-fi), etc. Further, the DMA can provide integrated prepaid billing, OAMP, network management, and AAA functionality. The DMA can include a Java based user interface and feature configuration system. Also, the DMA can provide real time call metering, call detail record (CDR) generation, and real time call provisioning. The DMA may be implemented in a relatively small footprint and has a relatively low power requirement. Further, the DMA may be implemented using inexpensive and widely available computer equipment.

With one or more of the deployment configurations described above, the present system provides mobile to landline calls from mobile handsets within a DMA cellular coverage area. Also, mobile to landline calls can be made from mobile handsets roaming into DMA coverage areas. Mobile to mobile calls can be made from home/roaming handsets to DMA handsets and vice versa. Further, mobile to IP calls and IP to mobile calls can be made from within a DMA coverage area. IP to IP calls can be made from any DMA handset to any IP phone. Additionally, IP to landline calls and landline to IP calls can be made from a DMA handset to any phone. Further, landline to mobile calls to DMA handsets can be made.

The systems described above can support call forwarding, call waiting, 3-way calling caller ID, voice mail, and mobile to mobile SMS service, i.e., text messaging. Further, the systems described above can provide broadcast SMS service, mobile to land high-speed IP data (1X or GPRS) service and mobile-to-mobile high speed IP data (1X or GPRS) service. Also, the systems described above can provide IP-PBX capability.

Further, one or more of the illustrated systems can provide IP transport between distributed elements, e.g., DMAs. Packet back-haul from BTS to RAN can be provided. Further, the control logic within the DMAs can be distributed and associated. Associated systems can be redundant, self-healing, self-organizing, and scalable. Distributed systems can be "snap-together," i.e., a DMA can be linked to a previously deployed DMA in order to broaden, or otherwise extend, cellular coverage. Further, distributed systems can be de-centralized to avoid single points of failure.

One or more of the systems described above can also provide soft and softer call handoffs on the same frequency interfaces. Also, soft handoffs can be provided on different systems. Further, a DMA based system can operate stand-alone with a billing system provided by a DMA and CDR generation. Or, a system can use the SS7 network to pass CDRs to a central switch for integrated billing and operation with an existing network.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a registration request from a first visiting mobile subscriber unit at a first distributed mobile architecture (DMA) node of a DMA network that includes a plurality of coverage sites, wherein the DMA network includes at least the first DMA node and a second DMA node, wherein the first DMA node is associated with a first coverage site of the DMA network, and wherein the second DMA node is associated with a second coverage site of the DMA network that is different from the first coverage site;
   in response to receipt of the registration request at the first DMA node, storing an identifier of the first visiting mobile subscriber unit at a first visitor location register (VLR) located at the first DMA node, wherein the first VLR stores first registration information associated with a first set of visiting mobile subscriber units that are located within the first coverage site of the DMA network and that are supported by the first DMA node;
   transmitting the identifier of the first visiting mobile subscriber unit from the first DMA node to a visitor location register (VLR) gateway via the second DMA node of the DMA network,
   wherein the VLR gateway is located at a different location than the first DMA node,
   wherein a second VLR that is located at the second DMA node stores second registration information associated with a second set of visiting mobile subscriber units that are located within the second coverage site of the DMA network and that are supported by the second DMA node,
   wherein the VLR gateway stores an Internet Protocol (IP) address of the first DMA node and the identifier of the first visiting mobile subscriber unit at a memory location within the VLR gateway to indicate that the first visiting mobile subscriber unit has registered at the first DMA node,
   wherein the VLR gateway stores the first registration information associated with the first set of visiting mobile subscriber units that are located within the first coverage site of the DMA network and that are supported by the first DMA node and stores the second registration information associated with the second set of visiting mobile subscriber units that are located within the second coverage site of the DMA network and supported by the second DMA node, and wherein at least one mobile subscriber unit in the first set of visiting mobile subscriber units is associated with a home coverage site that is distinct from the first coverage site and the second coverage site,
   wherein registration information associated with a particular visiting mobile subscriber unit includes an identifier of the particular visiting mobile subscriber unit and an IP address of a particular DMA node that supports the particular visiting mobile subscriber unit, and
   wherein the VLR gateway is coupled to an element of a wide area wireless network.

2. The method of claim 1, wherein the element of the wide area wireless network is a mobile switching center that is coupled to a home location register (HLR).

3. The method of claim 2, wherein the identifier of the first visiting mobile subscriber unit is forwarded from the VLR gateway to the HLR.

4. The method of claim 2, wherein the VLR gateway is operable to send a message to the mobile switching center.

5. The method of claim 4, wherein the VLR gateway receives a confirmation response from the mobile switching center in response to sending the message to the mobile switching center.

6. The method of claim 5, wherein the message includes the identifier of the first visiting mobile subscriber unit and wherein the confirmation response confirms registration of the first visiting mobile subscriber unit within the wide area wireless network and further comprising receiving a registration acknowledge message at the first DMA node after the VLR gateway receives the confirmation response.

7. The method of claim 1, wherein the wide area wireless network is a cellular network.

8. The method of claim 1, wherein the identifier of the first visiting mobile subscriber unit includes one of an international mobile station identifier (IMSI), an electronic serial number (ESN), and an International Mobile Equipment Identity (IMEI).

9. The method of claim 1, further comprising receiving a registration acknowledge message at the first DMA node from the VLR gateway after the identifier of the first visiting mobile subscriber unit is stored at the VLR gateway.

10. The method of claim 1, wherein the first visiting mobile subscriber unit is located outside of a home location area associated with the first visiting mobile subscriber unit.

11. The method of claim 1, wherein the VLR gateway is coupled to the second DMA node.

12. The method of claim 1, wherein the identifier of the first visiting mobile subscriber unit is transmitted from the first DMA node to the second DMA node via a wireless peer-to-peer IP data connection.

13. The method of claim 12, wherein the identifier of the first visiting mobile subscriber unit is transmitted from the first DMA node to the second DMA node via the wireless peer-to-peer IP data connection while the first DMA node is in motion.

14. The method of claim 13, wherein the identifier of the first visiting mobile subscriber unit is received at the second DMA node via the wireless peer-to-peer IP data connection while the second DMA node is in motion.

15. The method of claim 1, further comprising:
receiving a second registration request from a second visiting mobile subscriber unit at the first DMA node;
in response to receipt of the second registration request, storing a second identifier of the second visiting mobile subscriber unit at the first VLR, wherein the first set of visiting mobile subscriber units that are located within the first coverage site of the DMA network and that are supported by the first DMA node includes at least the first visiting mobile subscriber unit and the second visiting mobile subscriber unit; and
transmitting the second identifier of the second visiting mobile subscriber unit to the VLR gateway via the second DMA node, wherein the VLR gateway, in response to receipt of the second identifier, stores the IP address of the first DMA node and the second identifier of the second visiting mobile subscriber unit at the memory location within the VLR gateway to indicate that the second visiting mobile subscriber unit has registered at the first DMA node.

16. The method of claim 1, wherein the DMA network further includes a third DMA node that is associated with a third coverage site of the DMA network that is different from the first coverage site and the second coverage site, wherein a third VLR is located at the third DMA node, wherein the third VLR stores third registration information associated with a third set of visiting mobile subscriber units that are located within the third coverage site of the DMA network and that are supported by the third DMA node, and wherein the VLR gateway further stores the third registration information associated with the third set of visiting mobile subscriber units that are located within the third coverage site of the DMA network and that are supported by the third DMA node.

17. A system comprising:
a first distributed mobile architecture (DMA) node of a plurality of DMA nodes of a DMA network that includes a plurality of coverage sites, wherein the first DMA node is associated with a first coverage site of the DMA network, the first DMA node configured to:
  receive a registration request from a first visiting mobile subscriber unit;
  store an identifier of the first visiting mobile subscriber unit at a first visitor location register (VLR) located at the first DMA node in response to receipt of the registration request, wherein the first VLR stores first registration information associated with a first set of visiting mobile subscriber units that are located within the first coverage site of the DMA network and that are supported by the first DMA node; and
  transmit the identifier of the first visiting mobile subscriber unit to a visitor location register (VLR);
a second DMA node of the plurality of DMA nodes of the DMA network, wherein the second DMA node is associated with a second coverage site of the DMA network that is different from the first coverage site, the second DMA node configured to:
  receive the identifier of the first visiting mobile subscriber unit from the first DMA node, wherein a second VLR is located at the second DMA node, and wherein the second VLR stores second registration information associated with a second set of visiting mobile subscriber units that are located within the second coverage site of the DMA network and that are supported by the second DMA node; and
a visitor location register (VLR) gateway configured to:
  receive the identifier of the first visiting mobile subscriber unit via the second DMA node, wherein the VLR gateway is coupled to an element of a wide area wireless network, wherein the VLR gateway is located at a different location than the first DMA node, and wherein the VLR gateway stores the first registration information associated with the first set of visiting mobile subscriber units that are located within the first coverage site of the DMA network and that are supported by the first DMA node and stores the second registration information associated with the second set of visiting mobile subscriber units that are located within the second coverage site of the DMA network and that are supported by the second DMA node, and
wherein at least one mobile subscriber unit in the first set of visiting mobile subscriber units is associated with a home coverage site that is distinct from the first coverage site and the second coverage site,
wherein registration information associated with a particular visiting mobile subscriber unit includes an identifier of the particular visiting mobile subscriber unit and an Internet Protocol (IP) address of a particular DMA node that supports the particular visiting mobile subscriber unit,
wherein upon receipt of the identifier of the first visiting mobile subscriber unit at the VLR gateway, an IP address of the first DMA node and the identifier of the first visiting mobile subscriber unit are stored at a memory location within the VLR gateway to indicate that the first visiting mobile subscriber unit has registered at the first DMA node.

18. The system of claim 17, wherein the VLR gateway is coupled to the second DMA node.

19. The system of claim 17, wherein the wide area wireless network is a cellular network, wherein the element of the wide area wireless network is a mobile switching center that is coupled to a home location register (HLR), and wherein the VLR gateway is further configured to forward the identifier of the first visiting mobile subscriber unit to the HLR.

20. The system of claim 19, wherein the VLR gateway is further configured to send a message that includes the identifier of the first visiting mobile subscriber unit to the mobile switching center.

21. The system of claim 20, wherein the VLR gateway is further configured to receive a confirmation response in response to the message sent to the mobile switching center, wherein the confirmation response confirms registration of the first visiting mobile subscriber unit within the wide area wireless network, and wherein a registration acknowledge message is sent to the first DMA node after receiving the confirmation response.

22. The system of claim 17, wherein the identifier of the first visiting mobile subscriber unit includes one of an international mobile station identifier (IMSI), an electronic serial number (ESN), and an International Mobile Equipment Identity (IMEI).

23. The system of claim 17, wherein the first DMA node is further configured to transmit the identifier of the first visiting mobile subscriber unit to the second DMA node via a wireless peer-to-peer IP data connection while the first DMA node is in motion.

24. The system of claim 23, wherein the second DMA node is further configured to receive the identifier of the first visiting mobile subscriber unit via the wireless peer-to-peer IP data connection while the second DMA node is in motion.

25. The system of claim 17,
wherein the first DMA node is further configured to:
receive a second registration request from a second visiting mobile subscriber unit;
store a second identifier of the second visiting mobile subscriber unit at the first VLR, wherein the first set of visiting mobile subscriber units that are located within the first coverage site of the DMA network and that are supported by the first DMA node includes at least the first visiting mobile subscriber unit and the second visiting mobile subscriber unit; and
transmit the second identifier of the second visiting mobile subscriber unit to the VLR gateway via the second DMA node,
wherein in response to receipt of the second identifier at the VLR gateway, the VLR gateway stores the IP address of the first DMA node and the second identifier of the second visiting mobile subscriber unit at the memory location within the VLR gateway to indicate that the second visiting mobile subscriber unit has registered at the first DMA node.

26. The system of claim 17, further comprising a third DMA node of the plurality of DMA nodes of the DMA network, wherein the third DMA node is associated with a third coverage site of the DMA network that is different from the first coverage site and the second coverage site, wherein a third VLR is located at the third DMA node, wherein the third VLR stores third registration information associated with a third set of visiting mobile subscriber units that are located within the third coverage site of the DMA network and that are supported by the third DMA node, and wherein the VLR gateway further stores the third registration information associated with the third set of visiting mobile subscriber units that are located within the third coverage site of the DMA network and that are supported by the third DMA node.

* * * * *